US011770500B2

(12) United States Patent
Clark et al.

(10) Patent No.: US 11,770,500 B2
(45) Date of Patent: Sep. 26, 2023

(54) SYSTEM FOR MANAGING A VIRTUAL MEETING

(71) Applicant: Microchip Technology Incorporated, Chandler, AZ (US)

(72) Inventors: Lloyd Clark, Trondelag (NO); Keith Curtis, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 30 days.

(21) Appl. No.: 17/587,211

(22) Filed: Jan. 28, 2022

(65) Prior Publication Data

US 2023/0021608 A1    Jan. 26, 2023

Related U.S. Application Data

(60) Provisional application No. 63/222,253, filed on Jul. 15, 2021.

(51) Int. Cl.
*H04N 7/15* (2006.01)
*H04L 12/18* (2006.01)
(Continued)

(52) U.S. Cl.
CPC ........... *H04N 7/15* (2013.01); *H04L 12/1822* (2013.01); *H04N 21/439* (2013.01);
(Continued)

(58) Field of Classification Search
CPC .. H04N 21/4312; H04N 21/4788; H04N 7/15; H04N 21/439; H04N 21/44008; H04L 12/1822; H04L 12/1827
(Continued)

(56) References Cited

U.S. PATENT DOCUMENTS

2006/0247045 A1* 11/2006 Jeong ........................ H04N 7/15
348/E7.083
2010/0315482 A1* 12/2010 Rosenfeld ............. H04L 65/403
348/E7.083
(Continued)

FOREIGN PATENT DOCUMENTS

WO    2007/129942 A1    11/2007

OTHER PUBLICATIONS

International Search Report and Written Opinion, Application No. PCT/US2022/036458, 10 pages, dated Oct. 17, 2022.

*Primary Examiner* — Melur Ramakrishnaiah
(74) *Attorney, Agent, or Firm* — SLAYDEN GRUBERT BEARD PLLC

(57) ABSTRACT

A system for managing a virtual meeting (e.g., video conference) includes memory storing a video conference application and at least one processor to execute the video conference application to generate a virtual meeting view for a first attendee including multiple attendee video streams arranged according to a virtual attendee arrangement specifying positions of the attendee video streams relative to each other in the virtual meeting view, receive second attendee audio data associated with a second attendee video stream, identify a particular video stream position specified by the virtual attendee arrangement, determine differential stereo effect data corresponding with the particular video stream position, and apply the differential stereo effect data to the second attendee audio data to provide differential audio signals on different audio channels output to the first attendee to create a stereo sound effect corresponding with the particular video stream position.

27 Claims, 8 Drawing Sheets

(51) Int. Cl.
  *H04N 21/431*    (2011.01)
  *H04N 21/439*    (2011.01)
  *H04N 21/44*     (2011.01)
  *H04N 21/4788*   (2011.01)

(52) U.S. Cl.
  CPC ... *H04N 21/4312* (2013.01); *H04N 21/44008* (2013.01); *H04N 21/4788* (2013.01)

(58) Field of Classification Search
  USPC .......................................... 348/14.01–14.16
  See application file for complete search history.

(56) References Cited

U.S. PATENT DOCUMENTS

| | | | |
|---|---|---|---|
| 2018/0123813 A1 | 5/2018 | Milevski et al. | |
| 2021/0392291 A1* | 12/2021 | Nadav | G06F 3/165 |
| 2022/0191638 A1* | 6/2022 | Stengel | G06V 40/10 |

\* cited by examiner

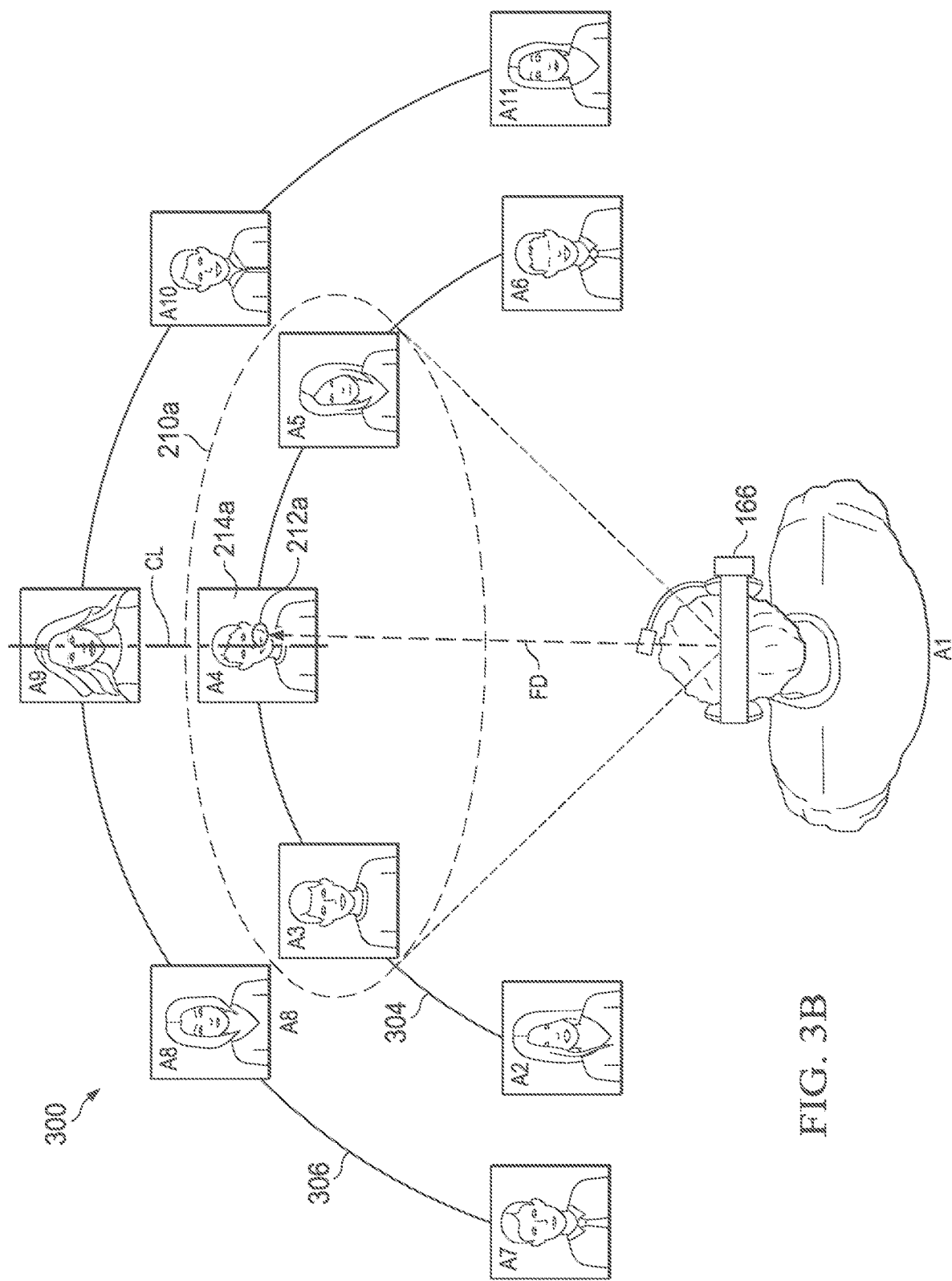

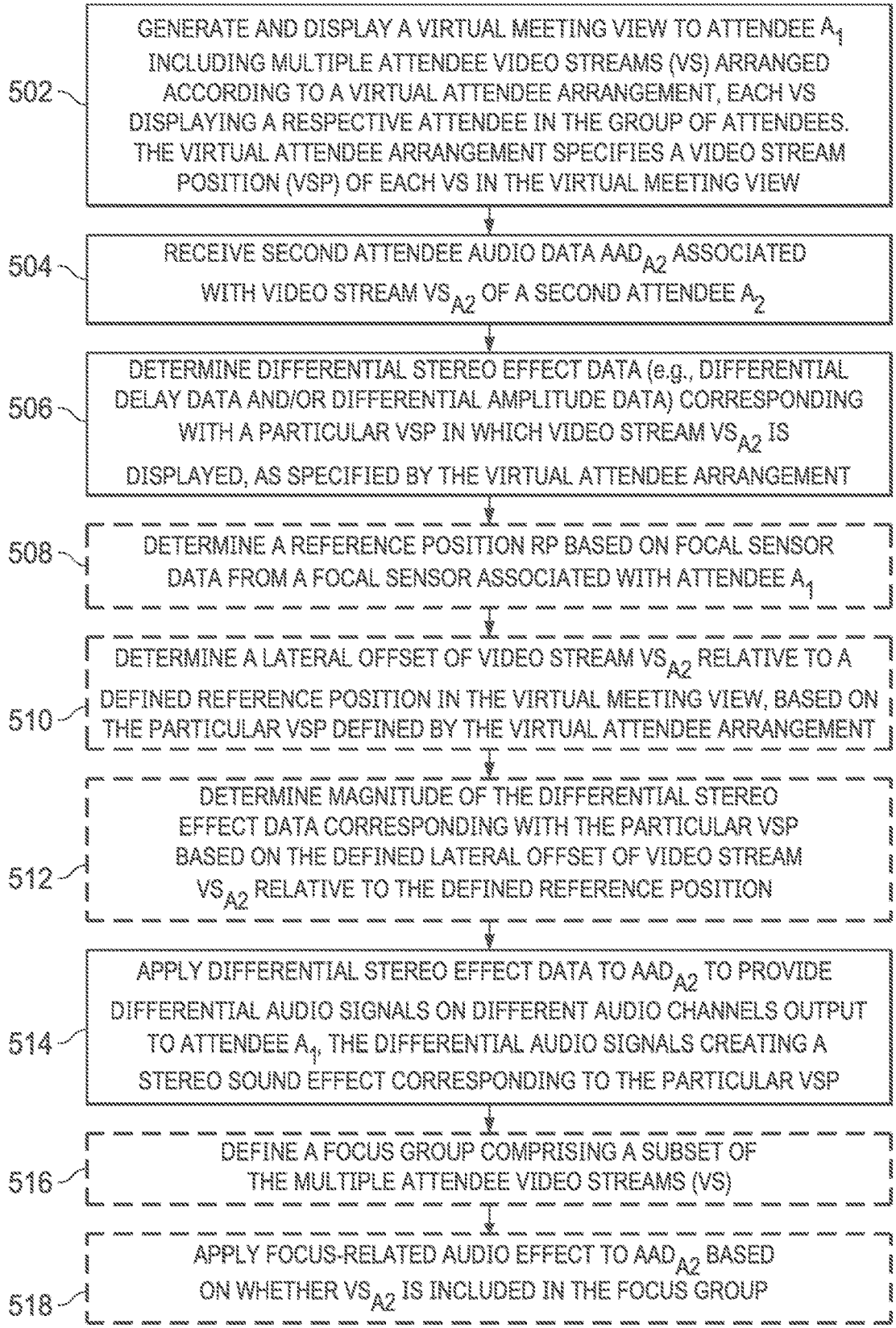

SYSTEM FOR MANAGING A VIRTUAL MEETING

RELATED PATENT APPLICATION

This application claims priority to commonly owned U.S. Provisional Patent Application No. 63/222,253 filed Jul. 15, 2021, the entire contents of which are hereby incorporated by reference for all purposes.

TECHNICAL FIELD

The present disclosure relates to conferencing and, more particularly, to systems for managing a virtual meeting, e.g., a video conference.

BACKGROUND

In a typical virtual meeting system, e.g., video conference system, an attendee may receive an unfiltered audio stream including unwanted speech and/or other noise that lowers the attendee's ability to effectively comprehend a speaker and/or contribute to the meeting. Some systems including a mute feature for muting audio from other attendees except a designated speaker. However, such systems may inhibit effective and efficient communications among the various attendees. For example, the need for each attendee to actively switch between mute and unmute settings may inhibit on-the-fly or off-the-cuff commentary or free-form back-and-forth discussion between attendees. Some systems employ a moderator tasked with managing individual attendee's ability to disable their mute setting to participate in the discussion which similarly may inhibit such discussion between attendees.

In addition, in a typical virtual meeting system, the audio output to each attendee does not have a spatial component. Thus, the audio does not provide the attendee any sense of the relative position of the other attendees.

Thus, there is a need for improved virtual meeting systems, e.g., video conference systems, providing a virtual meeting attendee a better experience.

SUMMARY

Systems and methods are provided for managing a virtual meeting (e.g., video conference) to provide a better experience for attendees (participants) of the video conference. For example, systems and methods are provided for automatically managing a virtual meeting view presented to a respective attendee, and for managing video conference audio output to the respective attendee, including audio originating from various other attendees. In some examples, a video conference (VC) application may manage and modify the virtual meeting view and video conference audio output to the respective attendee based on various input from the respective attendee, including input indicating a visual focus of the respective attendee in the virtual meeting view (e.g., indicating a focus on a particular video stream of another attendee). In some examples, the video conference (VC) application may selectively modify audio originating from other attendees based on various factors, for example including a virtual position of each other attendee and whether each other attendee is associated with a designated video stream (e.g., a "key stream") or a focus group defined by, or for, the respective attendee.

One aspect provides a system for managing a virtual meeting including a group of attendees, including non-transitory memory storing a video conference application comprising computer-readable instructions, and at least one processor communicatively coupled to the non-transitory memory to execute the video conference application to: generate and display, to a first attendee in the group of attendees, a virtual meeting view including multiple attendee video streams arranged according to a virtual attendee arrangement, each attendee video stream comprising a video stream of a respective attendee in the group of attendees, wherein the virtual attendee arrangement specifies a video stream position of each respective attendee video stream relative to each other attendee video stream in the virtual meeting view, including a particular video stream position of a second attendee video stream of a second attendee in the group of attendees; receive second attendee audio data associated with the second attendee video stream; determine differential stereo effect data corresponding with the particular video stream position specified by the virtual attendee arrangement; and apply the differential stereo effect data to the second attendee audio data to provide differential audio signals on different audio channels output to the first attendee, wherein the differential audio signals on the different audio channels create a stereo sound effect corresponding with the particular video stream position.

In some examples, the differential stereo effect data comprises differential delay data defining an audio delay differential between the different audio channels.

In some examples, the differential stereo effect data comprises differential amplitude data defining an amplitude differential between the different audio channels.

In some examples, the differential stereo effect data comprises (a) differential delay data defining a different audio delay on the different audio channels and (b) differential amplitude data defining a different audio amplitude on the different audio channels.

In some examples, the particular video stream position defined by the virtual attendee arrangement defines a lateral offset of the second attendee video stream relative to a defined reference position in the virtual meeting view, and a magnitude of the differential stereo effect data corresponding with the particular video stream position depends on the defined lateral offset of the second attendee video stream relative to the defined reference position.

In some examples, the defined reference position in the virtual meeting view corresponds with a position of a key stream of the multiple attendee video streams.

In some examples, the virtual attendee arrangement defines a number of attendees arranged between the second attendee and the defined reference position in the virtual meeting view, and the lateral offset of the second attendee video stream relative to the defined refence position is defined by a number of attendee video streams arranged between the second attendee video stream and the key stream in at least one direction.

In some examples, the key stream is selected by the first attendee. In other examples, the key stream is selected based on focus input received from the first attendee. In some examples, the focus input received from the first attendee comprises focal sensor data received from a focal sensor associated with the first attendee.

In some examples, the video conference application is executable to define a focus group comprising a subset of one or more attendee video streams of the multiple attendee video streams, determine whether the second attendee video stream is included in the focus group, and apply a focus-related audio effect to the second attendee audio data based on whether the second attendee video stream is included in the focus group.

In some examples, applying the focus-related audio effect to the second attendee audio data based on whether the second attendee video stream is included in the focus group comprises attenuating an amplitude of the second attendee audio data in response to determining the second attendee video stream is not included in the focus group.

In some examples, the video conference application is executable to receive focus input from the first attendee, and adjust the subset of attendee video streams in the focus group based on the focus input received from the first attendee.

In some examples, the video conference application is executable to determine a distance-related audio effect corresponding with a virtual distance between the second attendee and the first attendee assigned to the particular video stream position, and apply the distance-related audio effect to the second attendee audio data, the distance-related audio effect adjusting an amplitude of the second attendee audio data.

Another aspect provides a system for managing a virtual meeting including a group of attendees. The includes non-transitory memory storing computer-readable audio management instructions, and at least one processor communicatively coupled to the non-transitory memory to execute the video conference application to: generate and display, to a first attendee in the group of attendees, a virtual meeting view including multiple attendee video streams arranged according to a virtual attendee arrangement, each attendee video stream comprising a video stream of a respective attendee in the group of attendees, wherein the virtual attendee arrangement specifies a position of each respective attendee video stream relative to each other attendee video stream in the virtual meeting view; receive, from the first attendee, a focus input associated with a spatial focus of the first attendee; based at least on the received focus input, define a focus group of attendee video streams comprising a subset of one or more attendee video streams of the multiple attendee video streams; receive second attendee audio data associated with a second attendee video stream of the multiple attendee video streams, the second attendee video stream comprising a video stream of a second attendee in the group of attendees; determine whether the second attendee video stream is in the focus group; apply a focus-related audio effect to the second attendee audio data based on whether the second attendee video stream is in the focus group; and output the second attendee audio data with the applied audio effect to the first attendee via at least one audio channel.

In some examples, applying the focus-related audio effect to the second attendee audio data based on whether the second attendee video stream is included in the focus group comprises attenuating an amplitude of the second attendee audio data in response to determining the second attendee video stream is not included in the focus group.

In some examples, the video conference application is executable to dynamically adjust the subset of attendee video streams in the focus group based on the focus input received from the first attendee.

In some examples, the video conference application is executable to adjust a number of attendee video streams in the focus group based on the focus input received from the first attendee.

In some examples, the focus input received from the listener comprises focal sensor data received from a focal sensor associated with the first attendee.

In some examples, the virtual attendee arrangement defines a particular video stream position of the second attendee video stream, and the video conference application is executable to determine differential audio effect data corresponding with the particular video stream position defined by the virtual attendee arrangement, and output the second attendee audio data to the first attendee via multiple audio channels, wherein the differential audio effect data is applied to the multiple audio channels to create a stereo sound effect corresponding with the particular video stream position.

In some examples, the particular video stream position defined by the virtual attendee arrangement defines a lateral offset of the second attendee video stream relative to a defined reference position in the virtual meeting view, and a magnitude of the differential audio effect data corresponding with the particular video stream position depends on the defined lateral offset of the second attendee video stream relative to the defined reference position.

In some examples, the defined reference position comprises a key stream selected from the multiple attendee video stream based on focus input received from the first attendee.

In some examples, the focus input received from the first attendee comprises focal sensor data received from a focal sensor associated with the first attendee.

Another aspect provides a method for managing a virtual meeting including a group of attendees. The method includes generating and displaying, to a first attendee in the group of attendees, a virtual meeting view including multiple attendee video streams arranged according to a virtual attendee arrangement, each attendee video stream comprising a video stream of a respective attendee in the group of attendees. The virtual attendee arrangement specifies a video stream position of each respective attendee video stream relative to each other attendee video stream in the virtual meeting view, including a particular video stream position of a second attendee video stream of a second attendee in the group of attendees. The method further includes receiving second attendee audio data associated with the second attendee video stream, determining differential stereo effect data corresponding with the particular video stream position specified by the virtual attendee arrangement, and applying the differential stereo effect data to the second attendee audio data to provide differential audio signals on different audio channels output to the first attendee, wherein the differential audio signals on the different audio channels create a stereo sound effect corresponding with the particular video stream position.

In some examples, the differential stereo effect data comprises differential delay data defining an audio delay differential between the different audio channels.

In some examples, the differential stereo effect data comprises differential amplitude data defining an amplitude differential between the different audio channels.

In some examples, the particular video stream position defined by the virtual attendee arrangement defines a lateral offset of the second attendee video stream relative to a defined reference position in the virtual meeting view, and a magnitude of the differential stereo effect data corresponding with the particular video stream position depends on the defined lateral offset of the second attendee video stream relative to the defined reference position.

In some examples, the method includes determining the defined reference position based on focal sensor data received from a focal sensor associated with the first attendee.

In some examples, the method includes defining a focus group comprising a subset of one or more attendee video streams of the multiple attendee video streams, determining whether the second attendee video stream is included in the focus group, and applying a focus-related audio effect to the second attendee audio data based on whether the second attendee video stream is included in the focus group.

BRIEF DESCRIPTION OF THE DRAWINGS

Example aspects of the present disclosure are described below in conjunction with the figures, in which:

FIGS. 3A-3D are overhead views of a first example virtual physical arrangement corresponding with a virtual attendee arrangement of attendee video streams shown in FIG. 2;

FIG. 5 is a flowchart of an example method for managing aspects of an example video conference.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
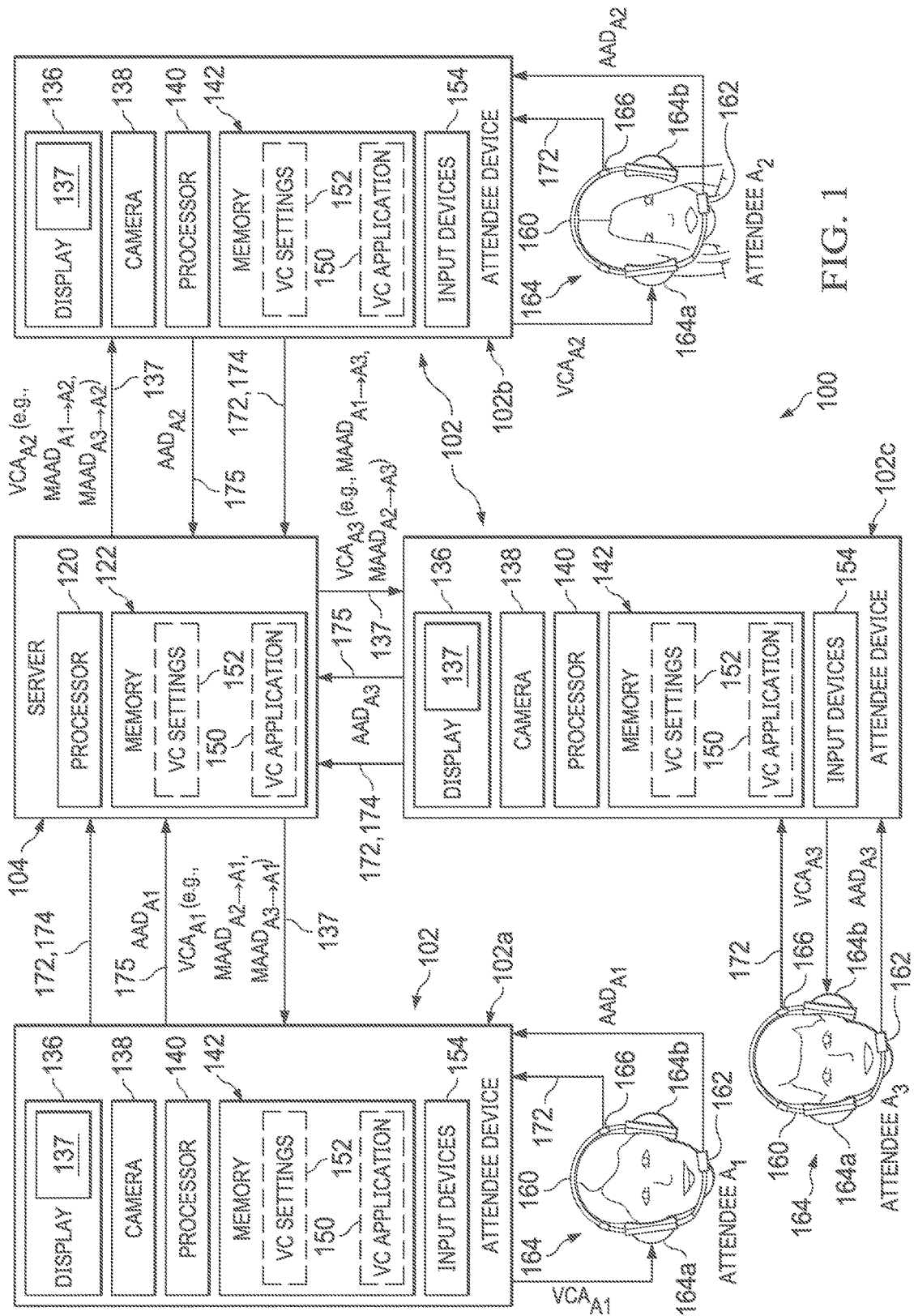
FIG. 1 shows an example video conference system according to one example of the present disclosure.

FIG. 1 shows an example video conference system 100 for managing a video conference including a group of attendees. Video conference system 100 includes multiple attendee devices 102a-102c communicatively connected to a server 104. Although FIG. 1 shows three attendee devices 102a-102c respectively associated with three attendees, it should be understood that any number of attendee devices associated with any number of attendees may be connected to server 104. In addition, although video conference system 100 is illustrated as a "one server (server 104) to multiple client (attendee devices 102a-102c)" topography, video conference system 100 may be implemented through any suitable network topology and protocol. Moreover, part, or all, of the functions performed by server 104 may be performed by individual attendee devices 102a-102c. For example, as discussed below, a video conference application ("VC application") 150 may be hosted and/or executed by server 104, attendee devices 102a-102c, or server 104 and attendee devices 102a-102c operating in cooperation.

Generally, each attendee device 102a-102c provides an interface allowing a user, referred to herein as a "meeting attendee" or simply "attendee," to participate in a virtual meeting, e.g., a video conference. For example, attendee devices 102a, 102b, and 102c are associated with three attendees of the video conference, namely attendees $A_1$, $A_2$, and $A_3$, respectively. Server 104 may receive various input streams, e.g., including video data, audio data, and user input data, from attendee devices 102a-102c. Server 104 may generate a video conference stream from the input streams received from attendee devices 102a-102c, and generate and distribute the generated video conference stream (including video and audio data) to each respective attendee devices 102a-102c. In some examples, video components and/or audio components of the video conference stream may be customized for each respective attendee device 102a-102c, e.g., based on user settings and/or focal data from each respective attendees $A_1$, $A_2$, and $A_3$. Focal data for each respective attendees $A_1$, $A_2$, and $A_3$ may indicate a visual focal point of the respective attendee on a displayed view of the video conference (referred to herein as a "virtual meeting view"), for example as determined based on focal sensor data associated with the respective attendee (e.g., sensor data from a headset-mounted directional sensor).

Figure 2:
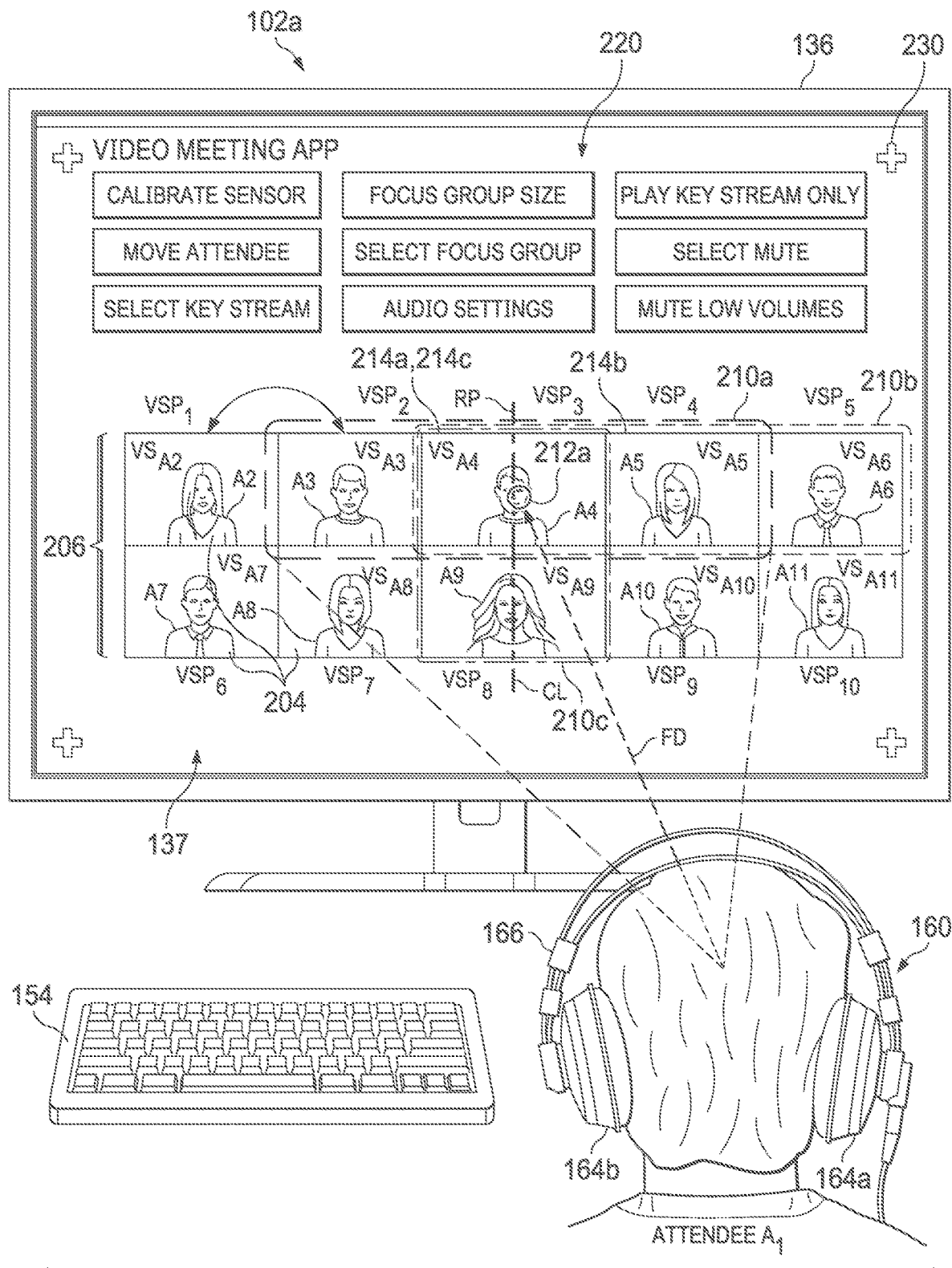
FIG. 2 illustrates an example virtual meeting view displayed to attendee $A_1$ via a display device in the example video conference system shown in FIG. 1.

Video conference system 100 includes a video conference application ("VC application") 150 which is executable to implement and manage the video conference for the various meeting attendees. For example, as discussed below, VC application 150 may be executable to (a) dynamically generate and adjust a respective virtual meeting view 137 for each respective attendee $A_1$-$A_3$, and (b) modify meeting audio data delivered to each respective attendee $A_1$-$A_3$, for example, by applying selected audio effects to audio data originating from other selected attendees, e.g., based on the position of each attendee's video stream in the respective virtual meeting view 137 and/or whether each attendee is a member of a defined "focus group" of attendees. FIG. 2, discussed in greater detail below, illustrates an example virtual meeting view 137 displayed to attendee $A_1$ including ten attendee video streams 204 of ten respective attendees (e.g., attendees $A_2$ and $A_3$ and eight additional attendees, and a focus group 210 including three of the ten attendee video streams 204.

Returning to FIG. 1, as indicated above, VC application 150 may be hosted and/or executed by server 104, by attendee devices 102, or by both server 104 and attendee devices 102-102c (e.g., wherein server 104 and attendee devices 102-102c host or execute different application modules for providing different functions related to the video conference).

Each attendee device 102a-102c may comprise a tablet, laptop, desktop computer, mobile phone (e.g., smart phone), or any other suitable electronic device. Each attendee device 102a-102c may include a display device 136, a camera 138, a processor 140, non-transitory memory 142, input devices 154 and any other circuitry and electronics to provide any of the functionality described herein.

Display device 136 may include a monitor, touchscreen, TV, or any other type of display device, based on any type of display technology, e.g., LCD (Liquid Crystal Display), LED (Liquid Emitting Diode), OLED (Organic Light Emitting Diode), Plasma, or CRT (Cathode Ray tube). Display device 136 may display a virtual meeting view 137 providing a virtual representation of a video conference. For example, the virtual meeting view 137 may include multiple attendee video streams arranged according to a "virtual attendee arrangement." Each attendee video stream is a video stream of a respective attendee of the video conference, each captured by a respective camera 138 facing the respective attendee. For example, the virtual meeting view 137 displayed to attendee $A_1$ may include multiple attendee video streams—including an attendee video stream of attendee $A_2$, an attendee video stream of attendee $A_3$, and an attendee video stream of each other video conference attendee—arranged according to a virtual attendee arrangement. The virtual attendee arrangement defines a physical arrangement of the multiple attendee video streams relative to each other. For examples, a virtual attendee arrangement may define a one-dimensional array of attendee video streams (e.g., a horizontal row of attendee video streams or a vertical column of attendee video streams), or a two-dimensional array of attendee video streams (e.g., multiple horizontal rows of attendee video streams, for example as shown in FIG. 2 discussed below).

Camera 138 may comprise a webcam or any other type of video camera suitable for generating an attendee video stream of a respective attendee $A_1$-$A_3$. Processor 140 may comprise one or more computer processor, e.g., one or more microprocessor, embedded processor, digital signal processor (DSP), media processor, or microcontroller.

Non-transitory memory 142 may comprise any one or more memory device for storing software and/or other data, for example RAM, ROM, Flash, hard drives, and/or any other type or types of volatile and/or non-volatile computer memory devices. As noted above, in some examples, VC application 150 may be at least partially hosted or executed by attendee devices 102a-102c. Thus, each attendee device 102a-102c may store VC management application 150 (or portions thereof) and/or video conference settings ("VC settings") 152. VC settings 152 may include settings related to implementing, executing, or managing a video conference, e.g., settings related to the virtual meeting view 137 (e.g., arrangement of attendee video streams) and/or settings related to audio effects for selected attendee audio data (e.g., data specifying a selected focus group size and/or selected focus group attendees, selected audio effects for selected attendees, or other settings related to audio effects for selected attendees).

As discussed above, in other examples the video conference may be fully implemented and managed by server 104 (e.g., using VC application 150 and/or VC settings 152 hosted or executed by server 104), wherein attendee devices 102a-102c may function as a video and audio data pass-through between attendees $A_1$-$A_3$ and server 104. In such examples, the VC application 150 and/or VC settings 152 may be omitted from attendee devices 102a-102c.

Input devices 154 may include any suitable devices for receiving user input 174 from each respective attendee $A_1$-$A_3$, which may be processed by VC application 150 (e.g., at respective attendee devices 102a-102c and/or at server 104) for managing various aspects of the video conference, e.g., including the virtual meeting view 137 displayed to each respective attendee and/or video conference audio (VCA) delivered to each respective attendee. User input 174 may include, for example: (a) user input for calibrating a focal sensor 166 (discussed below), (b) user input for configuring or adjusting a "virtual attendee arrangement" rearranging or repositioning attendee video streams, or otherwise configuring or manipulating the virtual meeting view 137 displayed to the respective attendee, (c) user input for selecting a meeting leader or "focal attendee," (d) user input for selecting and/or resizing a "focus group" of attendees, (e) user input for selecting or adjusting audio settings for a defined focus group or other selected attendee(s), (f) user input for controlling the respective attendee's microphone 162 (e.g., mute/unmute) and/or speakers 164a, 164b (e.g., amplitude adjustment), and/or any user input related to any other functions or aspects of the respective attendee's participation or interaction with the virtual meeting. Example input devices 154 includes touchscreens, touchpads, keyboards, mouse devices, and voice-based control systems.

Each attendee device 102a-102c may include, or be communicatively connected to, an audio I/O system 160 for communicating audio data between the respective attendee $A_1$-$A_3$ and respective attendee device 102a-102c. Each audio I/O system 160 may include a microphone 162 and a stereo output system 164, e.g., including right and left speakers 164a and 164b. Although each audio I/O system 160 is depicted in FIG. 1 as a headset, each audio I/O system 160 may otherwise comprise headphones, earbuds, virtual reality (VR) goggles, a microphone 162 and speakers 164a, 164b integrated in the respective attendee device 102 (e.g., microphone 162 and speakers 164a, 164b integrated in a laptop or desktop computer), a stand-alone microphone 162 and speakers 164a, 164b, or any combination of such devices.

Right and left speakers 164a and 164b of stereo output system 164 may be arranged at different locations relative to each respective attendee $A_1$-$A_3$ and capable to output independently controllable audio channels to create stereo audio effects providing the impression of sound coming from multiple directions. For example, right speaker 164a may be arranged on, or near, the attendee's right ear to output a right audio channel and left speaker 164b may be arranged on, or near, the attendee's left ear to output a left audio channel, wherein the right audio channel and left audio channel may be independently controllable to create a desired stereo audio effect for a particular audio stream. For instance, as discussed in detail below, VC application 150 may apply differential stereo effects to audio from selected attendees, referred to herein as attendee audio data or "AAD," to create an audio delay differential and/or an amplitude differential between the right audio channel and left audio channel output by right and left speakers 164a and 164b, respectively. The delay and/or amplitude differential between the right audio channel and left audio channel output may cause the listening attendee $A_1$-$A_3$ to perceive particular sounds (e.g., audio from another particular attendee $A_1$-$A_3$) as originating from the right, the left, or directly in front of the listening attendee $A_1$-$A_3$. In addition, application of differential stereo effect data may include modification of an audio signal to cause the listening attendee $A_1$-$A_3$ to perceive particular sounds (e.g., audio from another particular attendee $A_1$-$A_3$) as originating from above or below the listening attendee $A_1$-$A_3$.

As used herein, the "amplitude" of an audio signal (e.g., attendee audio data) may manifest as the volume magnitude of the respective audio signal output to the respective attendee, e.g., via speakers 164a, 164b. Thus, an amplitude differential between the right channel audio and left channel audio may manifest as a volume differential between the right channel audio output via right speaker 164a and the left channel audio output via left speaker 164b.

As shown, each audio I/O system 160 may send and receive audio data to and from the corresponding attendee device 102a-102c. For example, the microphone 162 of each respective attendee $A_1$-$A_3$ generates respective attendee audio data $AAD_{A1}$-$AAD_{A3}$ communicated to the respective attendee device 102a-102c and forwarded to server 104. In addition, each respective attendee device 102a-102c may forward respective video conference audio $VCA_{A1}$-$VCA_{A3}$ received from server 140 to speakers 164a, 164b for output to the respective attendee $A_1$-$A_3$.

The video conference audio $VCA_{A1}$-$VCA_{A3}$ delivered to each respective attendee $A_1$-$A_3$ (via respective speakers 164a, 164b) may include (a) attendee audio data $AAD_{A1}$-

$AAD_{A3}$ generated by other attendee(s) $A_1$-$A_3$ and/or (b) modified version(s) of $AAD_{A1}$-$AAD_{A3}$ generated by other attendee(s) $A_1$-$A_3$, referred to herein as modified attendee audio data, or "MAAD." MAAD may include selected attendee audio data $AAD_{A1}$-$AAD_{A3}$ modified by VC application 150 based on VC settings 152 and/or input data (e.g., focal sensor data 172 and/or user input 174) associated with the respective attendee $A_1$. Attendee audio data $AAD_{A1}$-$AAD_{A3}$ originating from a first respective attendee $A_1$-$A_3$ and modified (by VC application 150) for delivery and output to a second respective attendee $A_1$-$A_3$ is referenced herein as $MAAD_{X \to Y}$, wherein X indicates the first respective attendee (generating the relevant audio data) and Y indicates the second respective attendee $A_1$-$A_3$ (receiving the modified audio data).

Thus, for example, $AAD_{A2}$ originating from attendee $A_2$ and modified by VC application 150 for delivery and output to attendee $A_1$ (e.g., modified based on VC settings 152, focal sensor data 172, and/or user input 174 associated with attendee $A_1$) is indicated as $MAAD_{A2 \to A1}$. Similarly, $AAD_{A2}$ originating from attendee $A_2$ and modified by VC application 150 for delivery and output to attendee $A_3$ (e.g., modified based on VC settings 152, focal sensor data 172, and/or user input 174 associated with attendee $A_3$) is indicated as $MAAD_{A2 \to A3}$. $MAAD_{A2 \to A1}$ delivered to attendee $A_1$ may be the same as, or different than, $MAAD_{A2 \to A3}$ delivered to attendee $A_3$, depending on the VC settings 152, focal sensor data 172, and/or user input 174 associated with each respective attendee $A_1$ and $A_3$.

Audio modification inputs may include, for example, (a) specifics of the virtual attendee arrangement 137 displayed at the respective attendee device 102a-102c, (b) focal sensor data 172 from the respective attendee's focal sensor 166, (c) user input 174 from the respective attendee $A_1$-$A_3$, e.g., submitted via input devices 154, and/or any other suitable input.

As shown in FIG. 1, video conference audio $VCA_{A1}$ delivered to attendee $A_1$ (via respective speakers 164a, 164b) may include (a) attendee audio data $AAD_{A2}$ originating from attendee $A_2$ and delivered to attendee $A_2$ as $MAAD_{A2 \to A1}$ (or alternatively, as $AAD_{A2}$ if unmodified) and (b) attendee audio data $AAD_{A3}$ originating from attendee $A_3$ and delivered to attendee $A_2$ as $MAAD_{A3 \to A1}$ (or alternatively, as $AAD_{A3}$ if unmodified). Similarly, video conference audio $VCA_{A2}$ delivered to attendee $A_2$ may include (a) attendee audio data originating from attendee $A_1$ and delivered to attendee $A_2$ as $MAAD_{A1 \to A2}$ (or $AAD_{A1}$ if unmodified) and (b) attendee audio data originating from attendee $A_3$ and delivered to attendee $A_2$ as $MAAD_{A3 \to A2}$ (or $AAD_{A3}$ if unmodified). Similarly, video conference audio $VCA_{A3}$ delivered to attendee $A_3$ may include (a) attendee audio data originating from attendee $A_1$, delivered to attendee $A_3$ as $MAAD_{A1 \to A3}$ (or $AAD_{A1}$ if unmodified) and (b) attendee audio data originating from attendee $A_2$ and delivered to attendee $A_3$ as $AAD_{A2}$ or $MAAD_{A2 \to A3}$ (or $AAD_{A2}$ if unmodified)

In some examples video conference audio $VCA_{A1}$-$VCA_{A3}$ output to a particular attendee may include a mixture of unmodified attendee audio data AAD from one attendee and modified attendee audio data MAAD from another attendee, based on the VC settings 152, focal sensor data 172, and/or user input 174 associated with the particular attendee. For example, video conference audio $VCA_{A1}$ output to attendee $A_1$ may include unmodified attendee audio data $AAD_{A2}$ originating from attendee $A_2$ and modified attendee audio data $MAAD_{A3 \to A1}$ originating from attendee $A_3$.

In some examples, each audio I/O system 160 may include a focal sensor 166 that generates focal sensor data 172 for determining a focal point of the respective attendee $A_1$-$A_3$ in the virtual meeting view 137 displayed on the respective display device 136, e.g., corresponding with a particular attendee video stream (of another attendee) displayed in the virtual meeting view 137. In some examples, focal sensor 166 may be a head-mounted device mounted on the respective attendee's head or secured to a headset, glasses, or other device mounted on the attendee's head. For example, focal sensor 166 may comprise at least one head-mounted orientation sensor(s) for determining a directional and/or rotation orientation of the respective attendee's head (e.g., a compass, accelerometer, magnetometer, or any other type of orientation sensor), from which a focal point on the respective virtual meeting view 137 can be calculated. In other examples, focal sensor 166 may comprise an eye-tracking device, e.g., for tracking the attendee's pupil or pupils, from which a focal point in the virtual meeting view 137 can be calculated. FIG. 2 discussed below shows an example focal point 212 of attendee $A_1$ as determined based on focal sensor data 172 from a focal sensor 166 mounted on a headset implementation of audio I/O system 160 worn by attendee $A_1$.

Focal sensor data 172 from each focal sensor 166 may be communicated to the respective attendee device 102a-102c and forwarded to server 104 for processing. At server 104, processor 120 may execute VC application 150 to process focal sensor data 172 from the focal sensor 166 associated with each respective attendee $A_1$-$A_3$, for example to (a) determine a focal point of the respective attendee $A_1$-$A_3$ on the respective virtual meeting view 137, (b) manage the virtual meeting view 137 generated for each attendee $A_1$-$A_3$ and/or (c) determine and apply audio effects to selected attendee audio data $AAD_{A1}$-$AAD_{A3}$ resulting in modified attendee audio data MAAD for delivery to the respective attendee $A_1$-$A_3$.

For example, for focal sensor data 172 generated by focal sensor 166 and indicating a focal point of attendee $A_1$, VC application 150 may (a) determine a focal point of attendee $A_1$ on the virtual meeting view 137 displayed at attendee device 102a (e.g., identifying a particular attendee video stream displayed in the virtual meeting view 137), (b) manage the virtual meeting view 137 generated for attendee $A_1$ (and forwarded to the attendee device 102a for display via the display device 136) based on the focal sensor data 172, and (c) determine and apply audio effects to attendee audio data $AAD_{A2}$ and/or attendee audio data $AAD_{A3}$ based on the focal sensor data 172, resulting in $MAAD_{A2 \to A1}$ and/or $MAAD_{A3 \to A1}$ delivered and output to attendee $A_1$.

Each attendee device 102a-102c may be communicatively connected to server 104 by any suitable wireless and/or wired communication connections, e.g., including the Internet, local area network (LAN), wide area network (WAN), and/or other communication networks. Although server 104 is illustrated as a single device, server may comprise a single server computer or a network of multiple server computers. Server 104 may include a processor 120 and non-transitory memory 122.

Processor 120 may comprise one or more computer processor, e.g., one or more microprocessor, embedded processor, digital signal processor (DSP), media processor, or microcontroller. Non-transitory memory 122 may comprise any one or more memory device for storing software and/or other data, for example RAM, ROM, Flash, hard drives, and/or any other type or types of volatile and/or non-volatile computer memory devices. In some examples, non-transitory memory 122 may store VC application 150 and VC settings 152, or portions of VC application 150 and/or VC settings 152 (in examples in which VC application 150 is distributed between server 104 and attendee devices 102a-102c). As noted above and discussed in more detail below with reference to FIGS. 2-4, VC application 150 may be executable to (a) dynamically generate and adjust virtual meeting views 137 for each respective attendee $A_1$-$A_3$ (e.g., based on VC settings 152 associated with each respective attendee and/or user input 174 received from each respective attendee via respective input devices 154), and (b) apply selected audio effects to selected attendee audio data AAD to generate corresponding modified attendee audio data MAAD for delivery to selected attendees $A_1$-$A_3$, e.g., based on the position of each attendee's video stream in a respective virtual meeting view 137 and/or whether each attendee is a member of a defined "focus group" in the respective virtual meeting view 137, as discussed below.

In other examples, e.g., in which VC application 150 is fully hosted or executed by attendee devices 102a-102c, VC application 150 and/or VC settings 152 may be omitted from server 140, or server 140 may be omitted entirely.

FIG. 2 illustrates an example virtual meeting view 137 displayed to attendee $A_1$ via display device 136 of attendee device 102a in the example video conference system 100 shown in FIG. 1. An audio I/O system 160, in this example a headset worn by attendee $A_1$, includes a right speaker 164a for outputting a right audio channel, a left speaker 164b for outputting a left audio channel, and a focal sensor 166 formed integral with or mounted to the audio I/O system 160 (headset).

Virtual meeting view 137 displayed to attendee $A_1$ may include any number of attendee video streams (or simply "video streams" or "VS") of any number of video conference attendees. In the illustrated example, virtual meeting view 137 includes ten attendee video streams $VS_{A2}$-$VS_{A11}$ of ten respective attendees $A_2$-$A_{11}$ (i.e., attendees $A_2$ and $A_3$ shown in FIG. 1, along with eight additional attendees $A_4$-$A_{11}$ not shown in FIG. 1), a focus group 210 including a subset (in this example, three) of the ten attendee video streams $VS_{A2}$-$VS_{A11}$, and a set of user-selectable functions 220 for affecting the virtual meeting view 137 and/or video conference audio $VCA_{A1}$ (see FIG. 1) output to attendee $A_1$ (e.g., included attendee audio data AAD and/or modified attendee audio data MAAD from any one or more of attendees $A_2$-$A_{11}$).

Video streams $VS_{A2}$-$VS_{A11}$ are arranged according to an example virtual attendee arrangement 206 defining ten video stream positions $VSP_1$-$VSP_{10}$ arranged on two horizontal rows: a first row including five video streams $VSP_1$-$VSP_5$ and a second row including another five video streams $VSP_6$-$VSP_{10}$. The virtual attendee arrangement 206 specifies a position of each respective video stream $VS_{A2}$-$VS_{A11}$ relative to each other video stream $VS_{A2}$-$VS_{A11}$ in the virtual meeting view 137. For example, in a horizontal direction, from left to right:
  video streams $VS_{A2}$ and $VS_{A7}$ are respectively located in far-left video stream positions $VSP_1$ and $VSP_6$;
  video streams $VS_{A3}$ and $VS_{A8}$ are respectively located in left-of-center video stream positions $VSP_2$ and $VSP_7$;
  video streams $VS_{A4}$ and $VS_{A9}$ are respectively located in central video stream positions $VSP_3$ and $VSP_8$;
  video streams $VS_{A5}$ and $VS_{A10}$ are respectively located in right-of-center video stream positions $VSP_4$ and $VSP_9$; and
  video streams $VS_{A6}$ and $VS_{A11}$ are respectively located in far-right video stream positions $VSP_5$ and $VSP_{10}$.

Further, in a vertical direction:
  video streams $VS_{A2}$-$VS_{A6}$ are respectively located in upper row video stream positions $VSP_1$-$VSP_5$; and
  video streams $VS_{A7}$-$VS_{A11}$ are respectively located in lower video stream positions $VSP_6$-$VSP_{10}$.

The virtual attendee arrangement 206 of video streams $VS_{A2}$-$VS_{A11}$ may represent a virtual physical arrangement of the attendees $A_2$-$A_{11}$ displayed in the respective video streams $VS_{A2}$-$VS_{A11}$. In this example, video streams $VS_{A2}$-$VS_{A6}$ displayed in the upper row video stream positions $VSP_1$-$VSP_5$ represent attendees located a first virtual distance from attendee $A_1$, while video streams $VS_{A7}$-$VS_{A11}$ displayed in the lower row video stream positions $VSP_6$-$VSP_{10}$ represent attendees located a second virtual distance (greater than the first virtual distance) from attendee $A_1$. As discussed below, VC application 150 may modify each attendee audio data $AAD_{A2}$-$AAD_{A11}$ based on the virtual distance of each respective attendee $A_2$-$A_{11}$ from attendee $A_1$. For example, VC application 150 may reduce the amplitude of $AAD_{A7}$-$AAD_{A11}$ (from attendees $A_7$-$A_{11}$ displayed in the lower row video stream positions $VSP_6$-$VSP_{10}$) to define $MAAD_{A7}$-$MAAD_{A11}$ so as to output to attendee $A_1$ at a lower amplitude than $AAD_{A2}$-$AAD_{A6}$ (from attendees $A_2$-$A_6$ displayed in the upper row video stream positions $VSP_1$-$VSP_5$) output to attendee $A_1$. This may provide attendee $A_1$ a mental impression of attendees $A_7$-$A_{11}$ being further away than attendees $A_2$-$A_6$.

In addition, the horizontal position of each video stream $VS_{A2}$-$VS_{A11}$ (i.e., positioned in a far-left video stream position $VSP_1$ or $VSP_6$; a left-of-center video stream position $VSP_2$ or $VSP_7$; a central video stream position $VSP_3$ or $VSP_8$; a right-of-center video stream position $VSP_4$ or $VSP_9$; or a far-right video stream position $VSP_5$ or $VSP_{10}$, as defined above) represents a virtual lateral positioning of each respective attendee $A_2$-$A_{11}$ relative to attendee $A_1$. As discussed below, VC application 150 may selectively modify attendee audio data $AAD_{A2}$-$AAD_{A11}$ to provide attendee $A_1$ a perception of a lateral location of each respective attendee $A_2$-$A_{11}$ corresponding with the video stream position $VSP_1$-$VSP_{10}$ of the respective video stream $VS_{A2}$-$VS_{A11}$.

In some examples, the virtual attendee arrangement 206 may be populated at the start of a video conference in a defined sequence. For example, the virtual attendee arrangement 206 may be populated starting with the central video stream positions ($VSP_3$ and $VSP_8$) and moving outwardly to the left and right. In one example, one or more designating presenting attendees are populated first (to obtain the central video stream positions $VSP_3$ and $VSP_8$), followed by other meeting attendees.

FIGS. 3A-3D are overhead views of an example virtual physical arrangement 300 corresponding with the virtual attendee arrangement 206 of video streams $VS_{A2}$-$VS_{A11}$ of attendees $A_2$-$A_{11}$ shown in FIG. 2. Virtual physical arrangement 300 represents a virtual location of attendees $A_2$-$A_{11}$ relative to each other and relative to attendee $A_1$.

FIGS. 3A-3D show the example virtual physical arrangement 300 of the attendees $A_2$-$A_{11}$ in which attendees $A_2$-$A_{11}$ are arranged around attendee $A_1$ in a semicircular manner, with attendees $A_2$-$A_6$ displayed in the upper video stream positions $VSP_1$-$VSP_5$ (see FIG. 2) arranged around a first semicircle 304, and attendees $A_7$-$A_{11}$ displayed in the lower video stream positions $VSP_6$-$VSP_{10}$ (see FIG. 2) arranged around a second semicircle 306. The VC application 150 may assign a first virtual distance $D_{304}$ between attendee $A_1$ and each attendee $A_2$-$A_6$ arranged on the first semicircle 304, and a second virtual distance $D_{306}$ between attendee $A_1$ and each attendee $A_7$-$A_{11}$ arranged on the second semicircle 306.

Figure 3A:
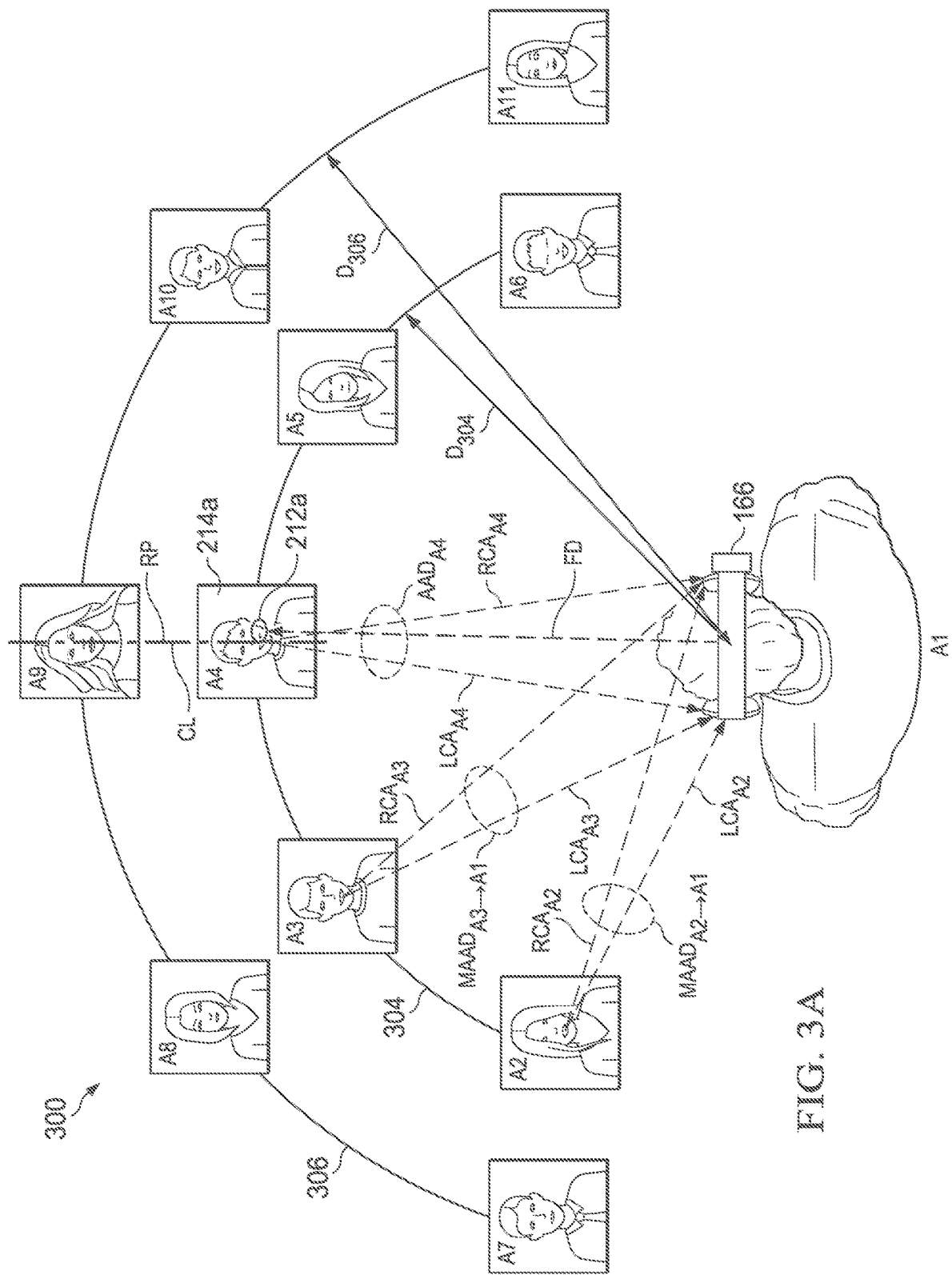

Based on this first example virtual physical arrangement 300, FIG. 3A illustrates (a) differential stereo effects selectively applied to attendee audio data $AAD_{A2}$-$AAD_{A11}$ as a function of a virtual lateral position of each respective attendee $A_2$-$A_{11}$, and (b) distance-related audio effects corresponding with a virtual distance of each respective attendee $A_2$-$A_{11}$ from attendee $A_1$. In the example virtual physical arrangement 300, (a) the virtual lateral position of each attendee $A_2$-$A_{11}$ is defined by a lateral position (or lateral offset) of each respective video stream $VS_{A2}$-$VS_{A11}$ relative to a defined reference position RP in the virtual meeting view 137, and (b) the virtual distance of each attendee $A_2$-$A_{11}$ from attendee $A_1$ is either (i) distance $D_{304}$ for attendees $A_2$-$A_6$ arranged on the first semicircle 304 (corresponding with video stream $VS_{A2}$-$VS_{A6}$ displayed in upper video stream positions $VSP_1$-$VSP_5$) or (ii) distance $D_{306}$ for attendees $A_7$-$A_{11}$ arranged on the second semicircle 306 (corresponding with video stream $VS_{A7}$-$VS_{A11}$ displayed in lower video stream positions $VSP_6$-$VSP_{10}$).

The reference position RP may comprise a selected point, multiple points, or area in the virtual meeting view 137, and may be fixed or dynamic over time. For example, reference position RP may comprises (a) a defined point or axis (line) in the virtual meeting view 137 (which may be visible or non-visible in the virtual meeting view 137), (b) a particular video stream position $VSP_1$-$VSP_{10}$ (or group of multiple video stream positions $VSP_1$-$VSP_{10}$), (c) a particular video stream $VS_{A2}$-$VS_{A11}$ (or group of multiple video streams $VS_{A2}$-$VS_{A11}$), (d) a focus group 210 including one or more video streams VS, or (e) any other reference point, multiple points, or area in the virtual meeting view 137.

In some examples, the reference position RP may be fixed. For instance, the defined reference position RP may comprise a vertical centerline CL, as indicated in FIGS. 2 and 3A-3D, or video stream positions $VSP_3$ and $VSP_8$ positioned on the vertical centerline CL. In such examples, the reference position RP may remain fixed regardless of a changing focus of attendee $A_1$ (e.g., as determined based on focus input received from attendee $A_1$, as discussed below).

In other examples, the reference position RP may dynamically move over time. For instance, the reference position RP may be defined based on focus input received from attendee $A_1$, for example (a) a focal point 212 determined based on focal sensor data 172 from focal sensor 166 mounted on attendee $A_1$, or (b) user input 174 received via input device 154 (e.g., mouse, keyboard, or touchscreen, without limitation) specifying a user-selected reference position RP. In one example, the reference position RP switches dynamically between different video streams $VS_{A2}$-$VS_{A11}$ based on (e.g., tracking) a current focal point 212 of attendee $A_1$ determined from focal sensor data 172 from focal sensor 166. In such examples, the virtual lateral position of each attendee $A_2$-$A_{11}$ may update dynamically as a function of the moving reference position RP, and the differential stereo effects applied to selective attendee audio data $AAD_{A2}$-$AAD_{A11}$ may be adjusted based on the updated virtual lateral positions. For example, if the reference position RP switches from $VSP_3$ to $VSP_4$ (e.g., tracking a current focal point 212 of attendee $A_1$ as determined from focal sensor data 172), VC application 150 may update the lateral position of each attendee as follows:

update attendees $A_5$ and $A_{10}$ from a right-of-center position to a central position;

update attendees $A_4$ and $A_9$ from a central position to a left-of-center position;

increase an offset distance for left-side attendees $A_2$, $A_3$, $A_7$, and $A_8$; and decrease an offset distance for right-side attendees $A_6$ and $A_{11}$.

In addition, VC application 150 may automatically update the differential stereo effects applied to attendee audio data $AAD_{A2}$-$AAD_{A11}$ based on the updated lateral positions of attendees $A_2$-$A_{11}$.

Differential stereo effects applied to selected attendee audio data $AAD_{A2}$-$AAD_{A11}$ may include an audio delay differential and/or an amplitude differential between the right audio channel and left audio channel output by right and left speakers 164a and 164b, respectively, which may cause attendee $A_1$ to perceive a lateral position of each respective attendee $A_2$-$A_{11}$ relative to the reference position RP, e.g., as defined by the virtual physical arrangement 300 shown in FIG. 3A and/or focus input as discussed above. For example, such differential stereo effects may allow attendee $A_1$ to perceive each respective attendee $A_2$-$A_{11}$ as being located in a laterally central position with respect to the reference position RP (e.g., directly in front of attendee $A_1$), to the left of the reference position RP, or to the right of the reference position RP, along with a virtual distance (or degree) of each attendee $A_2$-$A_{11}$ to the left or right of the reference position RP.

Thus, VC application 150 may create differential stereo effects for attendee audio data $AAD_{A2}$-$AAD_{A11}$ from each respective attendee $A_2$-$A_{11}$ by (a) identifying the position of the respective video stream VS specified by the virtual attendee arrangement 206 shown in FIG. 2 (represented by the virtual physical arrangement 300 of attendees $A_2$-$A_{11}$ shown in FIG. 3A), (b) determining differential stereo effect data corresponding with the identified position of the respective video stream VS, and (c) applying the differential stereo effect data to the attendee audio data $AAD_{A2}$-$AAD_{A11}$ from the respective attendee $A_2$-$A_{11}$ to provide differential audio signals between the right audio channel and left audio channel to create a stereo sound effect at attendee $A_1$ corresponding with the virtual position of the respective attendee $A_2$-$A_{11}$.

In some examples, the differential stereo effect data applied to each respective attendee audio data $AAD_{A2}$-$AAD_{A11}$ may include one or both of (a) differential delay data defining an audio delay differential between the different audio channels (right audio channel and left audio channel) output to attendee $A_1$ and (b) differential amplitude data defining an amplitude differential between the different audio channels (right audio channel and left audio channel) output to attendee $A_1$.

Differential delay data may define a time delay or time offset applied to one of the right audio channel or left audio channel, or a different time delay or time offset applied to the right audio channel and left audio channel, to create a differential timing offset between the audio output via the right speaker 164a versus the left speaker 164b. Differential amplitude data may define an amplitude adjustment applied to one of the right audio channel or left audio channel, or a different amplitude adjustment applied to the right and left audio channels, to create an amplitude differential between the audio output via the right speaker 164a versus the left speaker 164b. As discussed above, the audio delay differential and/or amplitude differential applied to attendee audio data $AAD_{A2}$-$AAD_{A11}$ may be defined by the position of the respective attendee's video stream $VS_{A2}$-$VS_{A11}$ in relation to the reference position RP in the virtual meeting view 137.

In some examples, VC application 150 may determine a lateral offset of each video stream $VS_{A2}$-$VS_{A11}$ (and thus each corresponding attendee $A_2$-$A_{11}$) relative to the reference position RP in the virtual meeting view 137, determine differential stereo effect data (e.g., differential delay data and/or differential amplitude data) corresponding with the lateral offset of the respective video stream $VS_{A2}$-$VS_{A11}$, and apply the determined differential stereo effect data to attendee audio data $AAD_{A2}$-$AAD_{A11}$ associated with the respective video stream $VS_{A2}$-$VS_{A11}$. The lateral offset of each video stream $VS_{A2}$-$VS_{A11}$ (and corresponding attendee $A_2$-$A_{11}$) may be defined by a distance between the respective video stream $VS_{A2}$-$VS_{A11}$ and the reference position RP, e.g., as defined by a number of video stream VS (or video stream positions VSP) separating the respective video stream $VS_{A2}$-$VS_{A11}$ from the reference position RP.

For instance, in an example scenario in which the reference position RP corresponds with the vertical centerline CL (or video stream positions $VSP_3$ and $VSP_8$ positioned on the vertical centerline CL), video streams $VS_{A3}$ and $VS_{A8}$ have a lateral offset of Left-1 (i.e., one VSP to the left of RP), video streams $VS_{A2}$ and $VS_{A7}$ have a lateral offset of Left-2 (two VSPs to the left of RP), video streams $VS_{A5}$ and $VS_{A10}$ have a lateral offset of Right-1 (one VSP to the right of RP), and video streams $VS_{A6}$ and $VS_{A11}$ have a lateral offset of Right-2 (two VSPs to the right of RP). In such example, VC application 150 may apply:

(a) first left-side differential delay data and/or first left-side differential amplitude data to attendee audio data $AAD_{A3}$ and $AAD_{A8}$ associated with $VS_{A3}$ and $VS_{A8}$ having a lateral offset of Left-1;

(b) second left-side differential delay data and/or second left-side differential amplitude data to attendee audio data $AAD_{A2}$ and $AAD_{A7}$ associated with $VS_{A7}$ and $VS_{A7}$ having a lateral offset of Left-2;

(c) first right-side differential delay data and/or first right-side differential amplitude data to attendee audio data $AAD_{A5}$ and $AAD_{A10}$ associated with $VS_{A5}$ and $VS_{A10}$ having a lateral offset of Right-1; and (d) second right-side differential delay data and/or second right-side differential amplitude data to attendee audio data $AAD_{A6}$ and $AAD_{A11}$ associated with $VS_{A6}$ and $VS_{A1}$ having a lateral offset of Right-2.

The second left-side delay differential data produces a greater delay differential (between the right and left audio channels) than the first left-side delay differential data, and the second left-side differential amplitude data defines a greater amplitude differential (between the right audio channel and left audio channel) than the first left-side differential amplitude data. Similarly, the second right-side delay differential data produces a greater delay differential (between the right and left audio channels) than the first right-side delay differential data, and the second right-side differential amplitude data defines a greater amplitude differential (between the right audio channel and left audio channel) than the first right-side differential amplitude data.

To further illustrate this example, with reference to FIG. 3A, VA application 150 may apply no differential delay data and no differential amplitude data to $AAD_{A4}$ and $AAD_{A9}$ associated with $VSP_3$ and $VSP_8$ located at the reference position RP. VA application 150 may apply the first left-side differential delay data and/or first left-side differential amplitude data to $AAD_{A3}$ associated with $VSP_2$ (Left-1 lateral offset), such that the right channel audio $RCA_{A3}$ is output to attendee $A_1$ with a first time delay and/or a first amplitude attenuation relative to the left channel audio $LCA_{A3}$. As shown, the right channel audio $RCA_{A3}$ and left channel audio $LCA_{A3}$, including first time delay and/or first amplitude attenuation, collectively define modified attendee audio data $MAAD_{A3 \to A1}$.

Similarly, VA application 150 may apply the second left-side differential delay data and first left-side differential amplitude data to $AAD_{A2}$ associated with $VSP_1$ (Left-2 lateral offset), such that the right channel audio $RCA_{A2}$ is output to attendee $A_1$ with a second time delay and second amplitude attenuation relative to the left channel audio $LCA_{A2}$. As shown, the right channel audio $RCA_{A2}$ and left channel audio $LCA_{A2}$, including second time delay and/or second amplitude attenuation, collectively define modified attendee audio data $MAAD_{A2 \to A1}$. The second time delay and second amplitude attenuation applied to $LCA_{A2}$ associated with attendee $A_2$ are greater than the first time delay and first amplitude attenuation applied to $LCE_{A3}$ associated with attendee $A_3$, respectively, due to the greater left-side offset of attendee $A_2$ as compared with attendee $A_3$.

In addition to differential stereo effects discussed above, VC application 150 may apply distance-related audio effects to attendee audio data $AAD_{A2}$-$AAD_{A11}$ as a function of a virtual distance of each respective attendee $A_2$-$A_{11}$ from attendee $A_1$, e.g., as defined based on virtual physical arrangement 300 shown in FIG. 3A. For example, as discussed above, each attendee $A_2$-$A_6$ arranged on the first semicircle 304 is located a first virtual distance $D_{304}$ from attendee $A_1$, each attendee $A_7$-$A_{11}$ arranged on the second semicircle 306 is located a second (greater) virtual distance $D_{306}$ from attendee $A_1$. VC application 150 may assign any relative values to the first virtual distance $D_{304}$ and second virtual distance $D_{306}$.

In some examples, VC application 150 may selectively set or adjust an amplitude of attendee audio data $AAD_{A2}$-$AAD_{A11}$ as a function of the virtual distance (e.g., $D_{304}$ or $D_{306}$) of each respective attendee $A_2$-$A_{11}$ from attendee $A_1$. For example, VC application 150 may set or reduce an amplitude of attendee audio data $AAD_{A7}$-$AAD_{A11}$ from attendees $A_7$-$A_{11}$ (located at the further virtual distance $D_{306}$ from attendee $A_1$) to a lower amplitude as compared with an amplitude of audio data $AAD_{A2}$-$AAD_{A6}$ from attendees $A_2$-$A_6$ (located at the closer virtual distance $D_{304}$ from attendee $A_1$). Distance-related amplitude adjustments to respective attendee audio data $AAD_{A2}$-$AAD_{A11}$ may be applied equally to both the right and left audio channels of the respective attendee audio data $AAD_{A2}$-$AAD_{A11}$. In addition, distance-related amplitude adjustments to respective attendee audio data $AAD_{A2}$-$AAD_{A11}$ may be applied in combination with any differential stereo effects discussed above, for example in a supplementary manner with differential amplitude effects related to the lateral position associated with the respective attendee audio data $AAD_{A2}$-$AAD_{A11}$.

As mentioned above, in some examples VC application 150 may apply focus-related audio effects to attendee audio data $AAD_{A2}$-$AAD_{A11}$, in addition to (or as an alternative to) differential stereo effects and/or distance-related audio effects applied to $AAD_{A2}$-$AAD_{A11}$ (e.g., any differential stereo effects and/or distance-related audio effects discussed above regarding FIG. 3A). In some examples, focus-related audio effect data may be selectively applied to attendee audio data $AAD_{A2}$-$AAD_{A11}$ based on whether each respective video stream $VS_{A2}$-$VS_{A11}$ (or associated attendee $A_2$-$A_{11}$) is a designated "key stream" of a member of a designated "focus group" for attendee $A_1$.

A key stream may refer to an individual video stream $VS_{A2}$-$VS_{A11}$, and a focus group may comprise a subset of one or more of the video streams $VS_{A2}$-$VS_{A11}$ including at least the key stream. VC application 150 may apply focus-related audio effects to attendee audio data AAD associated with the designated focus group, and may apply additional focus-related audio effects to attendee audio data AAD associated with the designated key stream.

The key stream and/or focus group may be fixed or may dynamically change, e.g., in response to input from attendee $A_1$. In some examples, VC application 150 may designate and/or dynamically adjust a key stream and/or focus group based on focus input received from attendee device 102a associated with attendee $A_1$. Focus input may include for example (a) focal sensor data 172 received from focal sensor 166 mounted to audio I/O system (e.g., headset) 160 worn by attendee $A_1$ and/or (b) user input 174 received from attendee $A_1$ via an input device 154, e.g., a keyboard, mouse, or touchscreen.

Figure 3C:
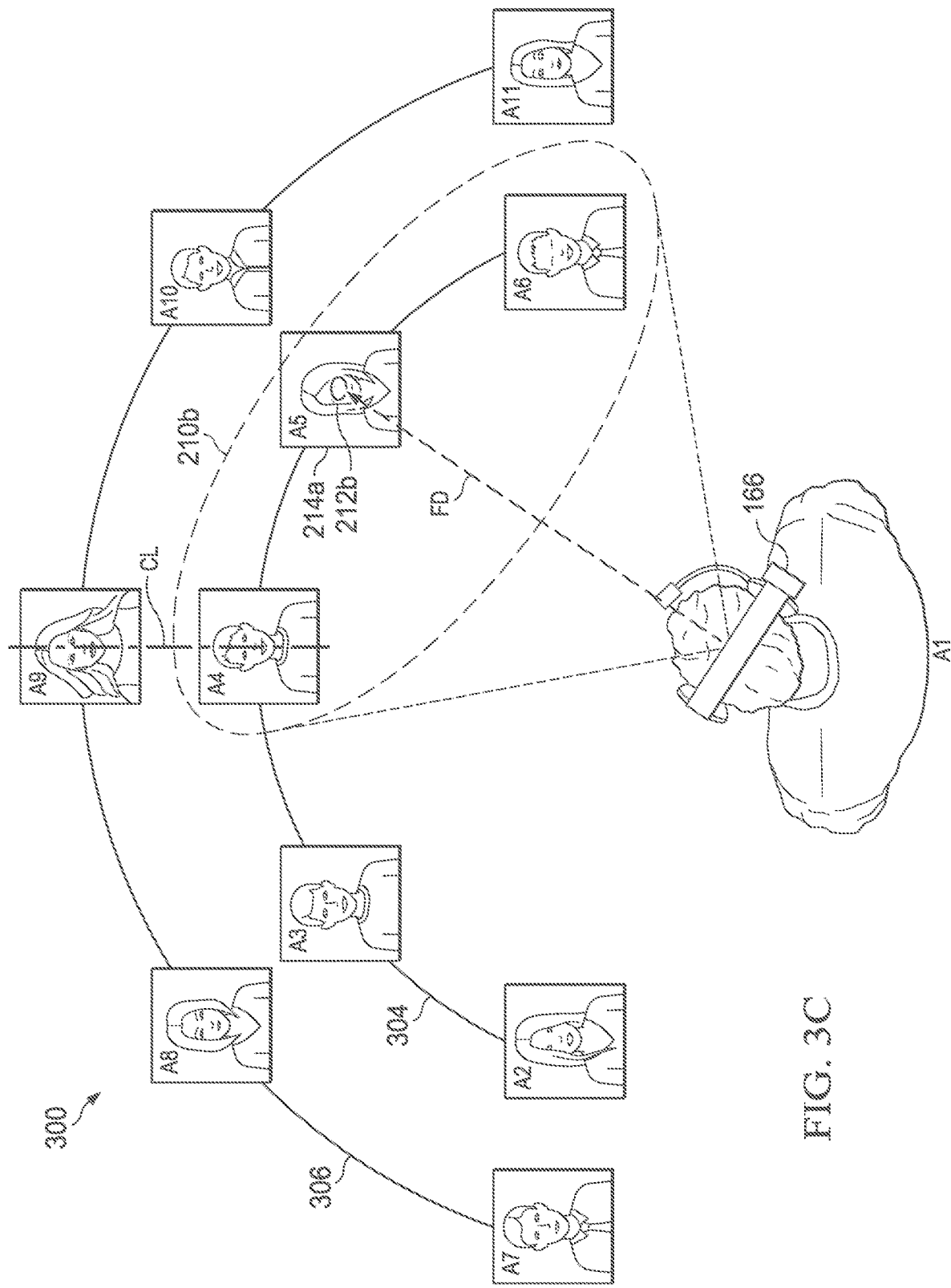
Figure 3D:
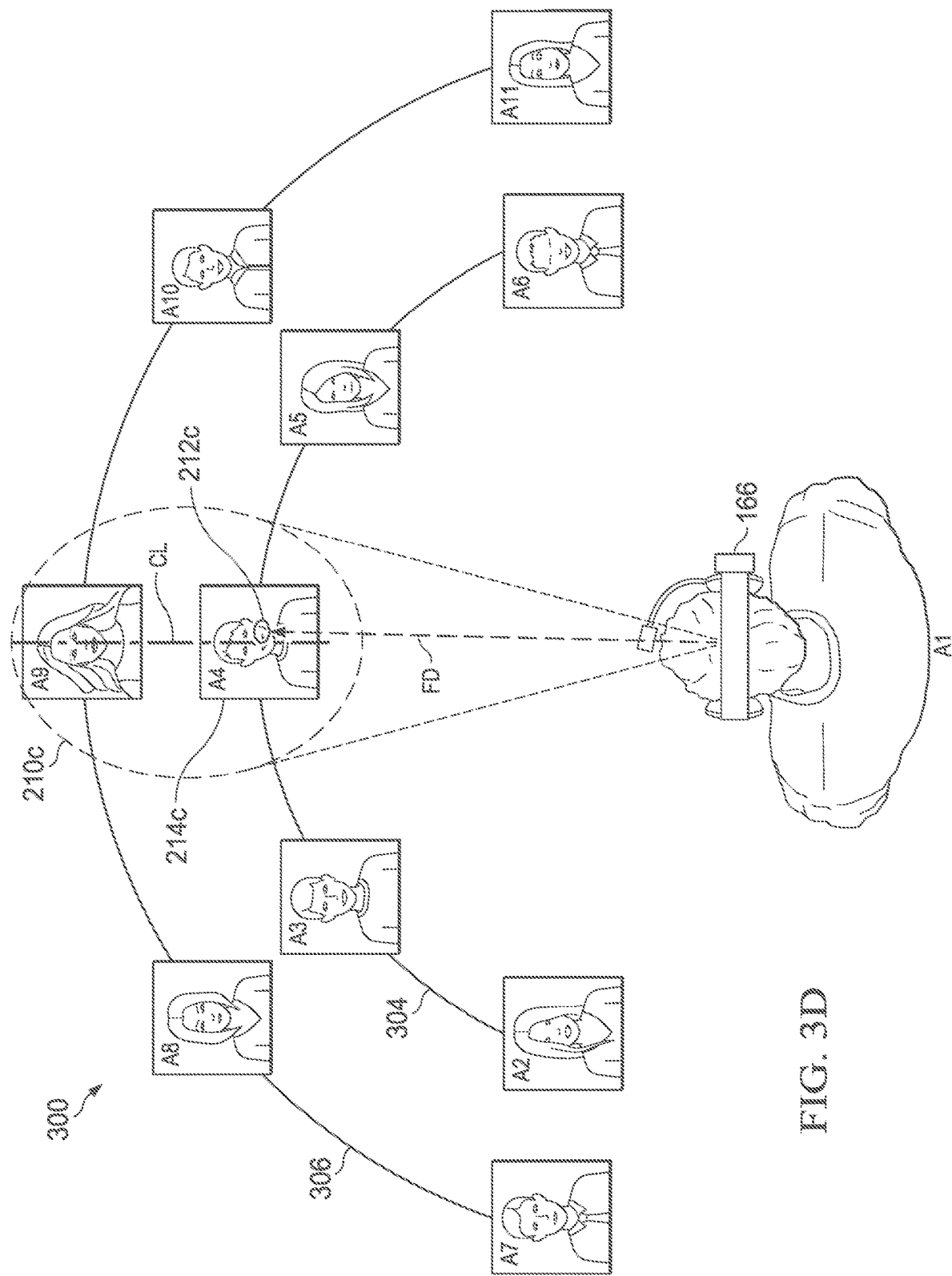

FIG. 2 shows three example focus groups 210a, 210b, and 210c each including a different subset of video streams $VS_{A2}$-$VS_{A11}$. FIGS. 3B, 3C, and 3D illustrate the three example key stream 214a, 214b, 214c and associated focus groups 210a, 210b, 210c, respectively, in relation to the virtual physical arrangement 300 shown in FIG. 3A.

As shown in FIG. 2 and FIG. 3B, video stream $VS_{A4}$ associated with attendees $A_4$ is designated as the key stream 214a, and focus group 210a includes three video streams $VS_{A3}$, $VS_{A4}$, and $VS_{A5}$ associated with attendees $A_3$, $A_4$, and $A_5$. Focus group 210a has a focus group size of 3×1 (i.e., three across in the lateral direction, one high in the vertical direction). In some examples, key stream 214a ($VS_{A4}$), focus group members ($VS_{A3}$, $VS_{A4}$, and $VS_{A5}$) and/or focus group size (3×1) of focus group 210a may be (a) automatically selected by VC application 150, e.g., based on focus input from attendee $A_1$ (e.g., focal sensor data 172 or user input 174), or (b) manually selected by attendee $A_1$ via an input device 154, e.g., using user-selectable functions 220 shown in FIG. 2, for example "Select Key Stream," "Select Focus Group," and/or "Focus Group Size" functions.

In some examples, VC application 150 may automatically select and adjust the key stream 214a and/or focus group 210a by (a) determining a focal point 212a based on focal sensor data 172 indicating a spatial orientation of attendee $A_1$'s head with respect to the virtual meeting view 137, (b) identifying a virtual stream VS co-located with or nearest to focal point 212a and designating the identified virtual stream VS as the key stream 214a, and (c) identifying focus group 210a as a set of video streams VS having a selected focus group size and centered on the determined focal point 212a or the identified key stream 214a. The spatial orientation of attendee $A_1$'s head is indicated in FIG. 2 by the focal direction arrow "FD" leading to focal point 212a. The selected focus group size may be defined by VC settings 152 associated with attendee $A_1$ or based on user input 174 from attendee $A_1$, e.g., using the example user-selectable functions 220 ("Select Focus Group"). In the example shown in FIG. 3B, VC application 150 may (a) determine focal point 212a based on focal sensor data 172, (b) define $VS_{A4}$ (co-located with focal point 212a) as the key stream 214a, and (c) define focus group 210a as the set of video streams $VS_{A3}$, $VS_{A4}$, and $VS_{A5}$ having the selected focus group size (3×1) and centered on the determined focal point 212a or key stream 214a ($VS_{A4}$). After defining key stream 214a and focus group 202a, VC application 150 may apply focus-related audio effect data to $AAD_{A3}$, $AAD_{A4}$, and $AAD_{A5}$ associated with focus group 202a, and may apply additional focus-related audio effect data to $AAD_{A4}$ associated with key stream 214a ($VS_{A4}$).

Focus-related audio effect data may define, for example, amplitude adjustments for selected video stream $VS_{A2}$-$VS_{A11}$ (i.e., amplitude adjustments for selected audio data $AAD_{A2}$-$AAD_{A11}$ associated with respective video stream $VS_{A2}$-$VS_{A11}$), for example based on whether each respective video stream $VS_{A2}$-$VS_{A11}$ is designated as the key stream 214a and whether each respective video stream $VS_{A2}$-$VS_{A11}$ is a member of focus group 202a. For example, focus-related audio effect data may define amplitude adjustments for selected video stream $VS_{A2}$-$VS_{A11}$ providing a first increased amplitude for focus group 210a (i.e., $AAD_{A3}$, $AAD_{A4}$, and $AAD_{A5}$ associated with $VS_{A3}$, $VS_{A4}$, and $VS_{A5}$) and a second (further) increased amplitude for key stream 214a (i.e., $AAD_{A4}$ associated with $VS_{A4}$). In some examples the amplitude adjustments may increase the amplitude levels for AADs associated with focus group 210a and key stream 214a; in other examples the amplitude adjustments may decrease (attenuate) the amplitude levels for AADs not associated with focus group 210a or key stream 214a.

As mentioned above, focus-related audio effects, differential stereo effects, and/or distance-related audio effects may be applied in combination (e.g., in a supplementary manner) for selected attendee audio data $AAD_{A2}$-$AAD_{A11}$. Table 1 illustrates example characteristics of modified attendee audio data $MAAD_{A2 \rightarrow A1}$ ... $MAAD_{A11 \rightarrow A1}$ output to attendee $A_1$ for the example scenario shown in FIGS. 2, 3A and 3B, i.e., including the example virtual attendee arrangement 206, example virtual physical arrangement 300 shown in FIGS. 3A-3B, and example key stream 214a ($VS_{A4}$) and focus group 210a ($VS_{A3}$, $VS_{A4}$, and $VS_{A5}$) shown in FIG. 3B. In particular, Table 1 shows example amplitude effects and delay effects applied to right channel audio (RCA) and left channel audio (LCA) for each $MAAD_{A2 \rightarrow A1}$ ... $MAAD_{A11 \rightarrow A1}$ output to attendee $A_1$. The values shown in Table 1 are example values for the purposes of illustration, and may have any suitable units (e.g., decibels for amplitude effect data, and microseconds for delay effect data).

TABLE 1

Example audio effects applied to attendee audio data.

| Source Attendee | Audio Channel | Focus group amplitude effect | Key stream amplitude effect | Distance-related amplitude effect | Lateral position: differential amplitude effect | Total amplitude effect (sum) | Lateral position: differential delay effect |
|---|---|---|---|---|---|---|---|
| $A_2$ | $RCA_{A2}$ | | | | −5 | −5 | −500 |
| | $LCA_{A2}$ | | | | | | |
| $A_3$ | $RCA_{A3}$ | +15 | | | −2 | +13 | −200 |
| | $LCA_{A3}$ | +15 | | | | +15 | |

TABLE 1-continued

Example audio effects applied to attendee audio data.

| Source Attendee | Audio Channel | Focus group amplitude effect | Key stream amplitude effect | Distance-related amplitude effect | Lateral position: differential amplitude effect | Total amplitude effect (sum) | Lateral position: differential delay effect |
|---|---|---|---|---|---|---|---|
| $A_4$ | $RCA_{44}$ | +15 | +5 | | | +20 | |
| | $LCA_{44}$ | +15 | +5 | | | +20 | |
| $A_5$ | $RCA_{45}$ | +15 | | | | +15 | |
| | $LCA_{45}$ | +15 | | | −2 | +13 | −200 |
| $A_6$ | $RCA_{46}$ | | | | | | |
| | $LCA_{46}$ | | | | −5 | −5 | −500 |
| $A_7$ | $RCA_{47}$ | | | −10 | −5 | −15 | −500 |
| | $LCA_{47}$ | | | −10 | | −10 | |
| $A_8$ | $RCA_{48}$ | | | −10 | −2 | −12 | −200 |
| | $LCA_{48}$ | | | −10 | | −15 | |
| $A_9$ | $RCA_{49}$ | | | −10 | | −10 | |
| | $LCA_{49}$ | | | −10 | | −10 | |
| $A_{10}$ | $RCA_{410}$ | | | −10 | | −10 | |
| | $LCA_{410}$ | | | −10 | −2 | −12 | −200 |
| $A_{11}$ | $RCA_{411}$ | | | −10 | | −10 | |
| | $LCA_{411}$ | | | −10 | −5 | −15 | −500 |

FIG. 3C shows example focus group 210b in relation to virtual physical arrangement 300. Focus group 210b is also shown in FIG. 2. As shown, focus group 210b includes three video stream $VS_{A4}$, $VS_{A5}$, and $VS_{A6}$ associated with attendees $A_4$, $A_5$, and $A_6$. Like focus group 210a, focus group 210b has a focus group size of 3×1 (i.e., three across in the lateral direction, one high in the vertical direction), but shifted one VSP to the right. The focus group members ($VS_{A4}$, $VS_{A5}$, and $VS_{A6}$) and/or focus group size (3×1) of focus group 210b may be selected and/or adjusted similar to focus group 210a discussed above. After defining focus group 210b, VC application 150 may apply focus-related audio effect data to $AAD_{A4}$, $AAD_{A5}$, and $AAD_{A6}$ associated with focus group 210b. In one example scenario, VC application 150 may automatically switch from focus group 210a to focus group 210b in response to detecting a shift in the focal point corresponding with focal sensor data 172 from focal point 212a shown in FIG. 3B (i.e., on attendee $A_4$) to focal point 212b shown in FIG. 3C (i.e., on attendee $A_5$).

FIG. 3D shows example focus group 210c in relation to virtual physical arrangement 300. Focus group 210c is also shown in FIG. 2. As shown, focus group 210c includes two video stream $VS_{A4}$ and $VS_{A9}$ associated with attendees $A_4$ and $A_9$. Unlike focus groups 210a and 210b having a focus group size of 3×1, focus group 210c has a focus group size of 1×2 (i.e., one across in the lateral direction, two high in the vertical direction), and aligned on the lateral centerline CL. The focus group members ($VS_{A4}$ and $VS_{A9}$) and/or focus group size (1×2) of focus group 210c may be selected and/or adjusted similar to focus groups 210a and 210b discussed above. After defining focus group 210c, VC application 150 may apply focus-related audio effect data to $AAD_{A4}$ and $AAD_{A9}$ associated with focus group 210c.

As noted above with respect to FIG. 2, virtual meeting view 137 may include a set of user-selectable functions 220 for managing or modifying the virtual meeting view 137 and/or video conference audio $VCA_{A1}$ output to attendee $A_1$ (e.g., including respective attendee audio data $AAD_{A2}$-$AAD_{A11}$ selectively modified as described above). User-selectable functions 220 may be selected by attendee $A_1$ using any suitable input device(s) 154, e.g., a keyboard, mouse, or touchscreen. After selection of certain user-selectable functions 220, the attendee $A_1$ may take various actions via input device(s) 154 related to the particular selected function 220.

In the example shown in FIG. 2, example user-selectable functions 220 include:

"Calibrate Sensor"—this function may allow attendee $A_1$ to calibrate the focal sensor 166 relative to virtual meeting view 137. For example, attendee $A_1$ may use calibration markers 230 to calibrate the focal sensor 166, e.g., by entering an input (e.g., mouse click and keyboard command) while looking at each calibration marker 230 in a sequential manner.

"Move Attendee"—this function may allow attendee $A_1$ to position and reposition video streams $VS_{A2}$-$VS_{A11}$ of attendees $A_2$-$A_{11}$ within virtual attendee arrangement 206, i.e., between the various video stream positions $VSP_1$-$VSP_{10}$.

"Select Key Stream"—this function may allow attendee $A_1$ to select a particular video stream $VS_{A2}$-$VS_{A11}$ as a key stream 214, wherein a defined audio effect is applied to the attendee audio data ADD associated with the selected key stream 214 (i.e., selected video stream $VS_{A2}$-$VS_{A11}$). In some examples, the selected key stream 214 is automatically moved to a designated video stream position (e.g., central video stream position $VSP_3$ or $VSP_8$) or automatically moved into the focus group 210, e.g., to a central position within the focus group 210a).

"Focus Group Size"—this function may allow attendee $A_1$ to select the shape and/or size of the focus group 210, for example by specifying a quantity (number) of video stream positions VSPs to include in the focus group 210, or by selecting particular video stream positions VSPs or tracing a boundary around a set of video stream positions VSPs to define the focus group 210.

"Select Focus Group"—this function may allow attendee $A_1$ to select the members (video streams VS) of the focus group 210. For example, attendee $A_1$ may select individual video streams $VS_{A2}$-$VS_{A11}$ to define the focus group 210. In an example in which selected video stream positions VSPs are designated for the focus group 210, video streams $VS_{A2}$-$VS_{A11}$ selected to define the focus group 210 not located in such designated VSPs may automatically populate into the designated VSPs.

"Audio Settings"—this function may allow attendee $A_1$ to set and manage various audio settings for attendee audio data $AAD_{A2}$-$AAD_{A11}$, for example to activate and deactivate selected audio effects (e.g., focus-related audio effects, differential stereo effects, and/or distance-related audio effects) and/or to set or manage the magnitude or other characteristic of each type of audio effect (e.g., focus-related audio effects, differential stereo effects, and/or distance-related audio effects).

"Play Key Stream Only"—this function may direct VC application 150 to mute all attendee audio data $AAD_{A2}$-$AAD_{A11}$ except audio associated with the key stream 214.

"Select Mute"—this function may allow attendee $A_1$ to selectively mute or unmute the audio data $AAD_{A2}$-$AAD_{A11}$ associated with each individual video stream $VS_{A2}$-$VS_{A11}$.

"Mute Low Amplitudes"—this function may direct VC application 150 to mute all audio data $AAD_{A2}$-$AAD_{A11}$ except audio data $AAD_{A2}$-$AAD_{A11}$ detected to exceed a defined threshold amplitude level.

In some examples, VC application 150 may automatically manage or modify the virtual meeting view 137 and/or video conference audio $VCA_{A1}$ output to attendee $A_1$ (e.g., including modified attendee audio data $MAAD_{A2 \to A1}$-$MAAD_{A11 \to A1}$ originating from respective attendee $A_2$-$A_{11}$) in response to selected actions of other attendee(s) $A_2$-$A_{11}$. For example, VC application 150 may manage the virtual meeting view 137 and/or video conference audio $VCA_{A1}$ output to attendee $A_1$ in a manner allowing attendee $A_1$ to monitor or experience the focus of a designed "leader" attendee $A_L$ (in the group of attendees $A_2$-$A_{11}$), e.g., to temporarily emphasize the video stream VS and/or audio AAD of other attendees currently interacting with attendee $A_L$, e.g., asking questions and receiving responses from attendee $A_L$.

For example, VC application 150 may detect a "leader-questioner engagement" defined by (a) a questioning attendee $A_Q$ presently speaking (e.g., above a defined amplitude threshold) and (b) the designated leader attendee $A_L$ presently focusing on (looking at) the speaking attendee $A_Q$. In some examples, the leader-questioner engagement may continue until the leader attendee $A_L$ changes focus to another attendee; thus the leader-questioner engagement may continue for the duration of a back-and-forth exchange between the questioning attendee $A_Q$ and leader attendee $A_L$.

Upon detecting a leader-questioner engagement, VC application 150 may (a) automatically move the video stream VS of the questioning attendee $A_Q$ ($VS_Q$) into a prominent position in the virtual meeting view 137 of attendee $A_1$, e.g., by temporarily swapping $VS_Q$ into focus group 210 of attendee $A_1$, and/or (b) apply any audio effects associated with the new position of $VS_Q$ (e.g., focus-related audio effects) or otherwise increase the amplitude or emphasize the attendee audio data AAD from the questioning attendee $A_Q$. In addition, VC application 150 may mute or attenuate the audio data AAD from all other attendees during the leader-questioner engagement.

In some examples, the designed leader attendee $A_L$ may be the attendee associated with the key stream 214 selected by or for attendee $A_1$, or an attendee designated as a meeting leader or other relevant designation, e.g., by a video conference moderator or settings related to the attendee $A_L$. The questioning attendee $A_Q$ may be any other attendee in the group of attendees $A_2$-$A_{11}$.

VC application 150 may determine leader attendee $A_L$ is presently focusing on (looking at) the questioning attendee $A_Q$ based on focus input associated with leader attendee $A_L$. For example, VC application 150 may determine a present focus of leader attendee $A_L$ is located on video stream $VS_Q$ in the virtual meeting view 137 displayed to leader attendee $A_L$. VC application 150 may detect the focus of leader attendee $A_L$ in a similar manner as described above for detecting the focus of attendee $A_1$. For example, VC application 150 may detect the focus of leader attendee $A_L$ based on focal sensor data 172 from a focal sensor 166 associated with leader attendee $A_L$ (e.g., mounted on a headset or other audio I/O system 160 worn by leader attendee $A_L$), based on user input from leader attendee $A_L$ (e.g., submitted by leader attendee $A_L$ via a respective input device 154), or based on any other input indicating a focus of leader attendee $A_L$.

Figure 4:
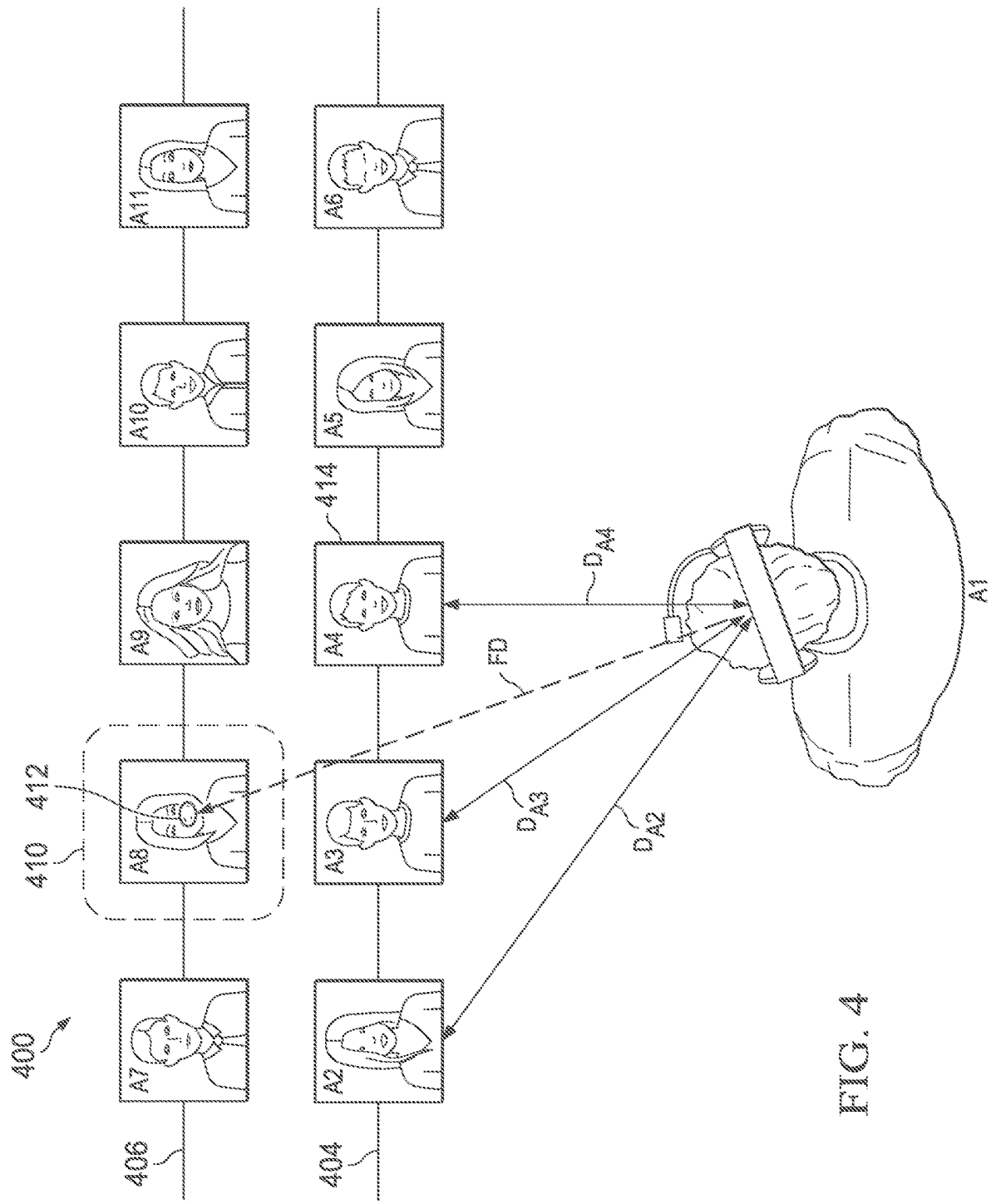
FIG. 4 is an overhead view of a second example virtual physical arrangement corresponding with the virtual attendee arrangement of attendee video streams shown in FIG. 2.

FIG. 4 shows another example virtual physical arrangement 400 corresponding with the virtual attendee arrangement 206 of video streams $VS_{A2}$-$VS_{A11}$ of attendees $A_2$-$A_{11}$ shown in FIG. 2. According to virtual physical arrangement 400, attendees $A_2$-$A_{11}$ are arranged in two parallel horizontal rows (as opposed to semicircular rows in the example virtual physical arrangement 300 discussed above), with attendees $A_2$-$A_6$ displayed in the upper video stream positions $VSP_1$-$VSP_5$ (see FIG. 2) arranged on a first row 404, and attendees $A_7$-$A_{11}$ displayed in the lower video stream positions $VSP_6$-$VSP_{10}$ (see FIG. 2) arranged on a second row 406.

VC application 150 may selectively apply differential stereo effects to attendee audio data $AAD_{A2}$-$AAD_{A11}$ as a function of a virtual lateral position of each respective attendee $A_2$-$A_{11}$, e.g., in a similar manner as discussed above regarding example virtual physical arrangement 300. In addition, VC application 150 may selectively apply distance-related audio effects corresponding with a virtual distance of each respective attendee $A_2$-$A_{11}$ from attendee $A_1$. However, the application of distance-related audio effects based on virtual physical arrangement 400 is different than the application of distance-related audio effects based on virtual physical arrangement 300 discussed above. As discussed above, virtual physical arrangement 300 defines (a) a common virtual distance $D_{304}$ for attendees $A_2$-$A_6$ arranged on the common semicircle 304 (i.e., corresponding with the upper video stream positions $VSP_1$-$VSP_5$), and thus a common distance-related audio effect may be applied to attendee audio data $AAD_{A2}$-$AAD_{A6}$, and (b) a common virtual distance $D_{306}$ for attendees $A_7$-$A_{11}$ arranged on the common semicircle 306 (i.e., corresponding with the lower video stream positions $VSP_6$-$VSP_{10}$), and thus a common distance-related audio effect may be applied to attendee audio data $AAD_{A7}$-$AAD_{A11}$.

In contrast, virtual physical arrangement 400 shown in FIG. 4 defines different virtual distances for different attendees $A_2$-$A_6$ arranged on the common row 404 (i.e., corresponding with the upper video stream positions $VSP_1$-$VSP_5$), and different virtual distances for different attendees $A_7$-$A_{11}$ arranged on the common row 406 (i.e., corresponding with the lower video stream positions $VSP_6$-$VSP_{10}$). For example, attendees $A_2$, $A_3$, and $A_4$ on the same row 404 are located at different respective virtual distances $D_{A2}$, $D_{A3}$, and $D_{A4}$ from attendee $A_1$. Thus, the distance-related audio effects for attendee audio data $AAD_{A2}$-$AAD_{A6}$ from attendees $A_2$-$A_6$ (displayed at upper video stream positions $VSP_1$-$VSP_5$) may vary based on the respective virtual distance between each attendee $A_2$-$A_6$ and attendee $A_1$ as defined by the virtual physical arrangement 400, for example with an increasing amplitude attenuation applied to increasing virtual distance between different respective attendees $A_2$-$A_6$ and attendee $A_1$. Similarly, the distance-related audio effects for attendee audio data $AAD_{A7}$-$AAD_{A11}$ from attendees $A_7$-$A_{11}$ (displayed at lower video stream positions $VSP_6$-$VSP_{10}$) may vary based on the respective virtual distance between each attendee $A_7$-$A_{11}$ and attendee $A_1$ as defined by the virtual physical arrangement 400.

FIG. 4 also shows (a) an example key stream 414 ($VS_{A4}$ associated with attendees $A_4$) and (b) an example focus group 410 (consisting of $VS_{A8}$ associated with attendees $A_8$) corresponding with an example focal point 412 of attendee $A_1$.

Key stream 414 ($VS_{A4}$ associated with attendees $A_4$) may be manually selected by attendee $A_1$ via an input device 154, e.g., using user-selectable function 220 "SELECT KEY STREAM" shown in FIG. 2, and remain fixed unless and until attendee $A_1$ manually selects a different key stream. Focus group 410 ($VS_{A8}$ associated with attendees $A_8$) may be automatically designated by VC application 150 based on the current focal point 412 determined from focal sensor data 172 generated by focal sensor 166. Thus, in this example, VC application 150 may automatically and dynamically select the focus group 410 (i.e., the respective VS corresponding with the current focal point 412 of attendee $A_1$) independent of the user-selected key stream 414. In some examples, VC application 150 may apply a respective focus-related audio effect to both the key stream 414 and focus group 410.

FIG. 5 is a flowchart of an example method 500 for managing aspects of an example video conference having a group of attendees, e.g., as performed by system 100 shown in FIG. 1. At 502, a virtual meeting view is generated by a VC application and displayed to a first attendee, attendee $A_1$. The virtual meeting view includes multiple attendee video streams (VS) arranged according to a virtual attendee arrangement. Each video stream VS displays a respective attendee in the group of attendees. The virtual attendee arrangement specifies a video stream position (VSP) of each video stream VS in the virtual meeting view.

At 504, second attendee audio data $AAD_{A2}$ associated with video stream $VS_{A2}$ of a second attendee $A_2$ is received by the VC application. At 506, the VC application may determine differential stereo effect data (e.g., differential delay data and/or differential amplitude data) corresponding with a particular video stream position VSP in which is video stream $VS_{A2}$ is displayed, as specified by the virtual attendee arrangement.

In some examples, the differential stereo effect data may be determined based at least in part on a lateral position of video stream $VS_{A2}$, e.g., according to the example (optional) step 508-512. At 508, the VC application may determine a reference position RP, e.g., based on focal sensor data from a focal sensor associated with attendee $A_1$, or based on other input from attendee $A_1$. At 510, the VC application may determine a lateral offset of video stream $VS_{A2}$ relative to a defined reference position in the virtual meeting view, based on the particular video stream position VSP in which is video stream $VS_{A2}$ is displayed, as specified by the virtual attendee arrangement. At 512, the VC application may determine a magnitude of each differential stereo effect data (e.g., specifying a differential delay magnitude and/or a differential amplitude magnitude) corresponding with the particular video stream position VSP based on the determined lateral offset of video stream $VS_{A2}$ relative to a defined reference position.

At 514, the VC application may apply the determined differential stereo effect data to $AAD_{A2}$ to provide differential audio signals on different audio channels output to attendee $A_1$. The differential audio signals on the different audio channels create a stereo sound effect at attendee $A_1$ corresponding with the particular video stream position VSP in which is video stream $VS_{A2}$ is displayed.

In some embodiments, the VC application may (optionally) also apply focus-related audio effects to $AAD_{A2}$. For example, at 516, the VC application may define a focus group comprising a subset of the multiple attendee video streams (VS) displayed in the virtual meeting view, and at 518, the VC application may apply focus-related audio effect to $AAD_{A2}$ based on whether $VS_{A2}$ is included or not included in the defined focus group.

Although example embodiments have been described above, other variations and embodiments may be made from this disclosure without departing from the spirit and scope of these embodiments.

The invention claimed is:

1. A system for managing a virtual meeting including a group of attendees, the system comprising:
   non-transitory memory storing a video conference application comprising computer-readable instructions; and
   at least one processor communicatively coupled to the non-transitory memory to execute the video conference application to:
     generate and display, to a first attendee in the group of attendees, a virtual meeting view including multiple attendee video streams arranged according to a virtual attendee arrangement, each attendee video stream comprising a video stream of a respective attendee in the group of attendees;
     wherein the virtual attendee arrangement specifies a video stream position of each respective attendee video stream relative to each other attendee video stream in the virtual meeting view, including a particular video stream position of a second attendee video stream of a second attendee in the group of attendees;
     wherein different ones of the attendee video streams are located at different respective offset distances relative to a defined reference position in the virtual meeting view;
     receive second attendee audio data associated with the second attendee video stream;
     determine a respective offset distance of the particular video stream position of the second attendee video stream relative to the defined reference position in the virtual meeting view;
     determine differential stereo effect data corresponding with the particular video stream position of the second attendee video stream specified by the virtual attendee arrangement as a function of the determined respective offset distance of the particular video stream position; and
     apply the differential stereo effect data to the second attendee audio data to provide differential audio signals on different audio channels output to the first attendee, wherein the differential audio signals on the different audio channels create a stereo sound effect corresponding with the determined respective offset distance of the particular video stream position.

2. The system of claim 1, wherein the differential stereo effect data comprises differential delay data defining an audio delay differential between the different audio channels.

3. The system of claim 1, wherein the differential stereo effect data comprises differential amplitude data defining an amplitude differential between the different audio channels.

4. The system of claim 1, wherein the differential stereo effect data comprises (a) differential delay data defining a different audio delay on the different audio channels and (b)

differential amplitude data defining a different audio amplitude on the different audio channels.

5. The system of claim 1, wherein:
the particular video stream position defined by the virtual attendee arrangement defines a lateral offset of the second attendee video stream relative to the defined reference position in the virtual meeting view; and
a magnitude of the differential stereo effect data corresponding with the particular video stream position depends on the defined lateral offset of the second attendee video stream relative to the defined reference position.

6. The system of claim 5, wherein the defined reference position in the virtual meeting view corresponds with a position of a key stream of the multiple attendee video streams.

7. The system of claim 6, wherein:
the virtual attendee arrangement defines a number of attendees arranged between the second attendee and the defined reference position in the virtual meeting view; and
the lateral offset of the second attendee video stream relative to the defined refence position is defined by a number of attendee video streams arranged between the second attendee video stream.

8. The system of claim 6, wherein the key stream is selected by the first attendee.

9. The system of claim 6, wherein the key stream is selected based on focus input received from the first attendee.

10. The system of claim 9, wherein the focus input received from the first attendee comprises focal sensor data received from a focal sensor associated with the first attendee.

11. The system of claim 1, wherein the video conference application is executable to:
define a focus group comprising a subset of one or more attendee video streams of the multiple attendee video streams;
determine whether the second attendee video stream is included in the focus group; and
apply a focus-related audio effect to the second attendee audio data based on whether the second attendee video stream is included in the focus group.

12. The system of claim 11, wherein applying the focus-related audio effect to the second attendee audio data based on whether the second attendee video stream is included in the focus group comprises attenuating an amplitude of the second attendee audio data in response to determining the second attendee video stream is not included in the focus group.

13. The system of claim 11, wherein the video conference application is executable to:
receive focus input from the first attendee; and
adjust the subset of attendee video streams in the focus group based on the focus input received from the first attendee.

14. The system of claim 1, wherein the video conference application is executable to:
determine a distance-related audio effect corresponding with a virtual distance between the second attendee and the first attendee assigned to the particular video stream position; and
apply the distance-related audio effect to the second attendee audio data, the distance-related audio effect adjusting an amplitude of the second attendee audio data.

15. A system for managing a virtual meeting including a group of attendees, the system comprising:
non-transitory memory storing computer-readable audio management instructions; and
at least one processor communicatively coupled to the non-transitory memory to execute the video conference application to:
generate and display, to a first attendee in the group of attendees, a virtual meeting view including multiple attendee video streams arranged according to a virtual attendee arrangement, each attendee video stream comprising a video stream of a respective attendee in the group of attendees;
wherein the virtual attendee arrangement specifies a position of each respective attendee video stream relative to each other attendee video stream in the virtual meeting view;
receive focal sensor data from a focal sensor, the focal sensor data indicating a spatial focus of the first attendee;
based at least on the received focal sensor data, define a focus group of attendee video streams comprising a subset of attendee video streams of the multiple attendee video streams, the subset of the attendee video streams including (a) a key stream corresponding with the spatial focus indicated by the focal sensor data and (b) at least one adjacent attendee video stream adjacent to the key stream;
receive second attendee audio data associated with a second attendee video stream of the multiple attendee video streams, the second attendee video stream comprising a video stream of a second attendee in the group of attendees,
determine whether the second attendee video stream is in the focus group;
apply a focus-related audio effect to the second attendee audio data based on whether the second attendee video stream is in the focus group; and
output the second attendee audio data with the applied audio effect to the first attendee via at least one audio channel.

16. The system of claim 15, wherein applying the focus-related audio effect to the second attendee audio data based on whether the second attendee video stream is included in the focus group comprises attenuating an amplitude of the second attendee audio data in response to determining the second attendee video stream is not included in the focus group.

17. The system of claim 15, wherein the video conference application is executable to dynamically adjust the subset of attendee video streams in the focus group based on the received focal sensor data.

18. The system of claim 15, wherein the video conference application is executable to adjust a number of attendee video streams in the focus group based on the received focal sensor data.

19. The system of claim 15, wherein:
the virtual attendee arrangement defines a particular video stream position of the second attendee video stream; and
the video conference application is executable to:
determine differential audio effect data corresponding with the particular video stream position defined by the virtual attendee arrangement; and
output the second attendee audio data to the first attendee via multiple audio channels, wherein the differential audio effect data is applied to the multiple audio channels to create a stereo sound effect corresponding with the particular video stream position.

20. The system of claim 19, wherein:
the particular video stream position defined by the virtual attendee arrangement defines a lateral offset of the second attendee video stream relative to the key stream determined based at least on the received focal sensor data; and
a magnitude of the differential audio effect data corresponding with the particular video stream position depends on the defined lateral offset of the second attendee video stream relative to the key stream.

21. A method for managing a virtual meeting including a group of attendees, the method comprising:
generating and displaying, to a first attendee in the group of attendees, a virtual meeting view including multiple attendee video streams arranged according to a virtual attendee arrangement, each attendee video stream comprising a video stream of a respective attendee in the group of attendees;
wherein the virtual attendee arrangement specifies a video stream position of each respective attendee video stream relative to each other attendee video stream in the virtual meeting view, including a particular video stream position of a second attendee video stream of a second attendee in the group of attendees;
receiving focus input from the first attendee;
determining a key stream from the multiple attendee video streams based on the received focus input, wherein the second attendee video stream is offset relative to the determined key stream;
receiving second attendee audio data associated with the second attendee video stream;
determining differential stereo effect data based on the offset of the second attendee video stream relative to the key stream; and
applying the differential stereo effect data to the second attendee audio data to provide differential audio signals on different audio channels output to the first attendee, wherein the differential audio signals on the different audio channels create a stereo sound effect corresponding with the particular video stream position.

22. The method of claim 21, wherein the differential stereo effect data comprises differential delay data defining an audio delay differential between the different audio channels.

23. The method of claim 21, wherein the differential stereo effect data comprises differential amplitude data defining an amplitude differential between the different audio channels.

24. The method of claim 21, comprising:
determining a lateral offset of the second attendee video stream relative to the key stream, based on the particular video stream position defined by the virtual attendee arrangement; and
determining a magnitude of the differential stereo effect data corresponding with the particular video stream position based on the defined lateral offset of the second attendee video stream relative to the defined reference position.

25. The method of claim 24, comprising determining the key stream based on focal sensor data received from a focal sensor associated with the first attendee.

26. The method of claim 21, comprising:
defining a focus group comprising a subset of one or more attendee video streams, including the key stream, from the multiple attendee video streams;
determining whether the second attendee video stream is included in the focus group; and
applying a focus-related audio effect to the second attendee audio data based on whether the second attendee video stream is included in the focus group.

27. The system of claim 1, wherein:
the second attendee video stream is located on a first lateral side of the defined reference position at a first respective offset distance relative to the defined reference position;
a third attendee video stream is located on the first lateral side of the defined reference position at a second respective offset distance relative to the defined reference position greater than the first respective offset distance;
apply first differential stereo effect data to the second attendee audio data corresponding with the second attendee video stream as a function of the first respective offset distance of the second video stream position; and
apply second differential stereo effect data to the third attendee audio data corresponding with the third attendee video stream as a function of the second respective offset distance of the third video stream position, the second differential stereo effect data being different than the first differential stereo effect data as a function of the second respective offset distance being greater than the first respective offset distance.

* * * * *